United States Patent
Lanier et al.

(10) Patent No.: US 10,325,407 B2
(45) Date of Patent: Jun. 18, 2019

(54) ATTRIBUTE DETECTION TOOLS FOR MIXED REALITY

(71) Applicant: Microsoft Technology Licensing, LLC, Redmond, WA (US)

(72) Inventors: Jaron Lanier, Berkeley, CA (US); Judith Amores Fernandez, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 22 days.

(21) Appl. No.: 15/395,513

(22) Filed: Dec. 30, 2016

(65) Prior Publication Data

US 2018/0075658 A1    Mar. 15, 2018

Related U.S. Application Data

(60) Provisional application No. 62/395,298, filed on Sep. 15, 2016.

(51) Int. Cl.
| | |
|---|---|
| G06T 19/00 | (2011.01) |
| G06T 11/00 | (2006.01) |
| G06F 3/01 | (2006.01) |
| G06T 19/20 | (2011.01) |
| G06F 3/0482 | (2013.01) |

(Continued)

(52) U.S. Cl.
CPC ............ *G06T 19/006* (2013.01); *G06F 3/011* (2013.01); *G06F 3/0482* (2013.01); *G06F 3/04815* (2013.01); *G06F 3/04845* (2013.01); *G06T 11/001* (2013.01); *G06T 19/20* (2013.01); *G06T 2200/24* (2013.01); *G06T 2215/16* (2013.01); *G06T 2219/2012* (2013.01)

(58) Field of Classification Search
None
See application file for complete search history.

(56) References Cited

U.S. PATENT DOCUMENTS

| | | |
|---|---|---|
| 8,335,675 B1 | 12/2012 | DiVerdi et al. |
| 2006/0007123 A1 | 1/2006 | Wilson et al. |

(Continued)

FOREIGN PATENT DOCUMENTS

| | | |
|---|---|---|
| WO | 2014131197 A1 | 9/2014 |

OTHER PUBLICATIONS

Bouvier, et al., "Immersive visual and audio world in 3D", In Proceedings of 8th International Conference on Computer Games: Artificial Intelligence and Mobile Systems, Nov. 22, 2006, pp. 1-7.

(Continued)

*Primary Examiner* — Michelle Chin
(74) *Attorney, Agent, or Firm* — Merchant & Gould

(57) ABSTRACT

Techniques described herein include mixed reality tools, referred to as HoloPaint, that allow use of any of a variety of sensors to determine physical parameters of real objects in a mixed reality environment. HoloPaint may correlate current measurements of the real world with past measurements to perform inventory management, analysis of changes of physical parameters of real objects and environments, and so on. A user may select which parameter to analyze by selecting a particular type of virtual paint, such as for drawing onto an object to be analyzed.

20 Claims, 18 Drawing Sheets

(51) Int. Cl.
*G06F 3/0484* (2013.01)
*G06F 3/0481* (2013.01)

(56) References Cited

U.S. PATENT DOCUMENTS

| | | |
|---|---|---|
| 2007/0209586 A1 | 9/2007 | Ebensberger et al. |
| 2008/0024597 A1 | 1/2008 | Yang et al. |
| 2008/0046226 A1 | 2/2008 | Massie et al. |
| 2008/0215994 A1 | 9/2008 | Harrison et al. |
| 2010/0210332 A1 | 8/2010 | Imai |
| 2011/0099476 A1 | 4/2011 | Snook et al. |
| 2011/0141009 A1 | 6/2011 | Izumi |
| 2011/0276891 A1 | 11/2011 | Ecko |
| 2012/0113223 A1 | 5/2012 | Hilliges et al. |
| 2012/0249741 A1 | 10/2012 | Maciocci et al. |
| 2012/0306853 A1 | 12/2012 | Wright et al. |
| 2014/0002472 A1 | 1/2014 | Sobeski et al. |
| 2014/0160001 A1 | 6/2014 | Kinnebrew et al. |
| 2014/0184496 A1* | 7/2014 | Gribetz ............... G02B 27/017 345/156 |
| 2014/0310640 A1 | 10/2014 | Kim et al. |
| 2015/0229750 A1 | 8/2015 | Zhou et al. |
| 2015/0248169 A1 | 9/2015 | Abovitz et al. |
| 2016/0026253 A1 | 1/2016 | Bradski et al. |
| 2016/0054791 A1 | 2/2016 | Mullins et al. |
| 2016/0073029 A1 | 3/2016 | Markovitz |
| 2016/0210781 A1 | 7/2016 | Thomas et al. |
| 2018/0075657 A1 | 3/2018 | Lanier et al. |

OTHER PUBLICATIONS

Fuhrmann, et al., "Multi-Context Augmented Reality", In Technical report TR-186-2-99-14, 1999, 11 pages.
Graham, "Tilt Brush Update Lets You Paint With Sound", retrieved on Sep. 15, 2015, available at: <<http://vrboard.io/tilt-brush-update-lets-you-paint-with-sound.html>>, Aug. 2, 2016, 7 pages.
Ip, et al., "Interactive 3D canvas for Virtual Action Painting", In Journal of Software, vol. 11, Issue 9, Nov. 2000, pp. 1159-1166.
Leapmotion.com, "Orion Beta" retrieved on Sep. 15, 2016, available at: <<https://developer.leapmotion.com/orion>>, 6 pages.
"MetaVRse—Mixed Reality Branded Painting Experience", retrieved on: Sep. 15, 2016, available at: <<http://metavrse.co/events/branded-painting-experience/>>, 2 pages.
Otsuki, et al., "MAI Painting Brush: An Interactive Device That Realizes the Feeling of Real Painting", In Proceedings of the 23nd Annual ACM Symposium on User Interface Software and Technology, Oct. 3, 2010, pp. 97-100.
Robertson, "Tilt Brush's Awesome VR Paintings Can Now Respond to Music", retrieved on Sep. 15, 2016, available at: <<http://www.theverge.com/2016/8/2/12350844/tilt-brush-virtual-reality-painting-music-visualization-audio-reactor>>, Aug. 2, 2016, 8 pages.
Somerville, "App Detail >> Holo-Paint", retrieved on Sep. 15, 2016, available at: <<http://www.148apps.com/app/394071865/>>, Oct. 4, 2010, 11 pages.
Tech Desk, "Google's Tilt Brush: Now Paint 3D Images in Virtual Space and Walk around Them Too", retrieved on Sep. 15, 2016, available at: <<http://indianexpress.com/article/technology/gadgets/google-tilt-brush-app-virtual-reality-3d-painting-features-2802072/>>, The Indian Express, May 16, 2016, 12 pages.
Thegameveda, "Microsoft HoloLens: 3D Draw MR gets it's Tiltbrush?", YouTube video, available at: <<https://www.youtube.com/watch?v=AMeZRPGrnRM>>, Sep. 5, 2016.
Virtalis.com, "What Do We Mean by Virtual Reality?", retrieved on Sep. 15, 2016, available at: <<https://www.virtalis.com/virtual-reality/>>, Jun. 18, 2016, 8 pages.
Burns, "Kingspray Graffiti Simulator in VR is magical (with SG Mixed Reality)", available at: <<https://www.slashgear.com/kingspray-vr-graffiti-simulator-will-make-you-a-believr-06442812/>>, published on: Jun. 6, 2016, 7 pages.
Konieczny, et al., "VR Spray Painting for Training and Design", in the Proceedings of the ACM Symposium on Virtual Reality Software and Technology, Oct. 27, 2008, pp. 293-294.
Lee, et al., "Virtual Reality Content-Based Training for Spray Painting Tasks in the Shipbuilding Industry", In ETRI Journal, vol. 32, Iss. 5, Oct. 6, 2010, pp. 695-703.
Nakashima, et al., "A 2D-3D Integrated Environment for Cooperative Work", in the Proceedings of the ACM Symposium on Virtual Reality Software and Technology, Nov. 7, 2005, pp. 16-22.
Sandor, et al., "Exploring Visuo-Haptic Mixed Reality", In Human Machine Perception Laboratory, Jan. 12, 2007, 6 pages.
Sareika, et al., "Urban Sketcher: Mixed Reality on Site for Urban Planning and Architecture", In Proceedings of the 6th IEEE and ACM International Symposium on Mixed and Augmented Reality, Nov. 13, 2007, 4 pages.
Shilkrot, et al., "Augmented Airbrush for Computer Aided Painting (CAP)", In Journal ACM Transactions on Graphics, vol. 34, Iss. 3, Feb. 2015, 11 pages.
"Final Office Action Issued in U.S. Appl. No. 15/395,256", Dated May 31, 2018, 31 Pages.
"Final Office Action Issued in U.S. Appl. No. 15/395,256", Dated Dec. 14, 2018, 29 Pages.
"Non Final Office Action Issued in U.S. Appl. No. 15/395,256", Dated Nov. 2, 2017, 27 Pages.
"Non Final Office Action Issued in U.S. Appl. No. 15/395,256", Dated Sep. 7, 2018, 29 Pages.

* cited by examiner

ATTRIBUTE DETECTION TOOLS FOR MIXED REALITY

PRIORITY APPLICATION

This application claims the benefit of and priority to U.S. Provisional Patent Application No. 62/395,298, filed on Sep. 15, 2016, titled "HoloPaint," which is incorporated herein by reference.

BACKGROUND

Computing systems can help generate new environments including virtual reality environments and/or mixed reality environments. Virtual reality is an immersive experience, which simulates physical presence in a real or imagined environment. For example, a virtual reality environment can immerse a physical, real-world person with computer-generated graphics in a computer-generated, virtual scene via a virtual reality display device. Mixed reality, which can also be known as augmented reality, is a hybrid reality experience, which merges real worlds and virtual worlds. Mixed reality is a technology that produces mixed reality environments where a physical, real-world person and/or objects in physical, real-world scenes co-exist with virtual, computer-generated people and/or objects in real time. For example, a mixed reality environment can augment a physical, real-world scene and/or a physical, real-world person with computer-generated graphics in the physical, real-world scene viewed via a mixed reality display device.

Co-located and/or remotely located users can communicate via virtual reality or mixed reality technologies. Various additional and/or alternative technologies are available to enable remotely located users to communicate with one another. For instance, remotely located users can communicate via visual communication service providers that leverage online video chat, online voice calls, online video conferencing, remote desktop sharing, etc.

SUMMARY

Techniques described herein include mixed reality tools, referred to as HoloPaint, that allows one or more users to turn their physical environment into a painting and drawing canvas. In a mixed reality environment, the user is able to paint or draw in the air and/or on a surface. In a mixed reality environment, HoloPaint may allow the one or more users to paint in the air, mold and extract 3D meshes of surfaces, select among a number of various properties from the physical environment, spray and surface paint, splatter paint, and sculpt or shape digital content, among other things. In some examples, functionality of HoloPaint may be applied to the real world based on physical attributes (e.g., color, heat, motion, sound, etc.) of objects or spaces of the real world. Such functionality may be used to solve real world problems (e.g., optimization, inventory, modeling, detection, etc.).

It should be appreciated that the above-described subject matter can be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of techniques in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
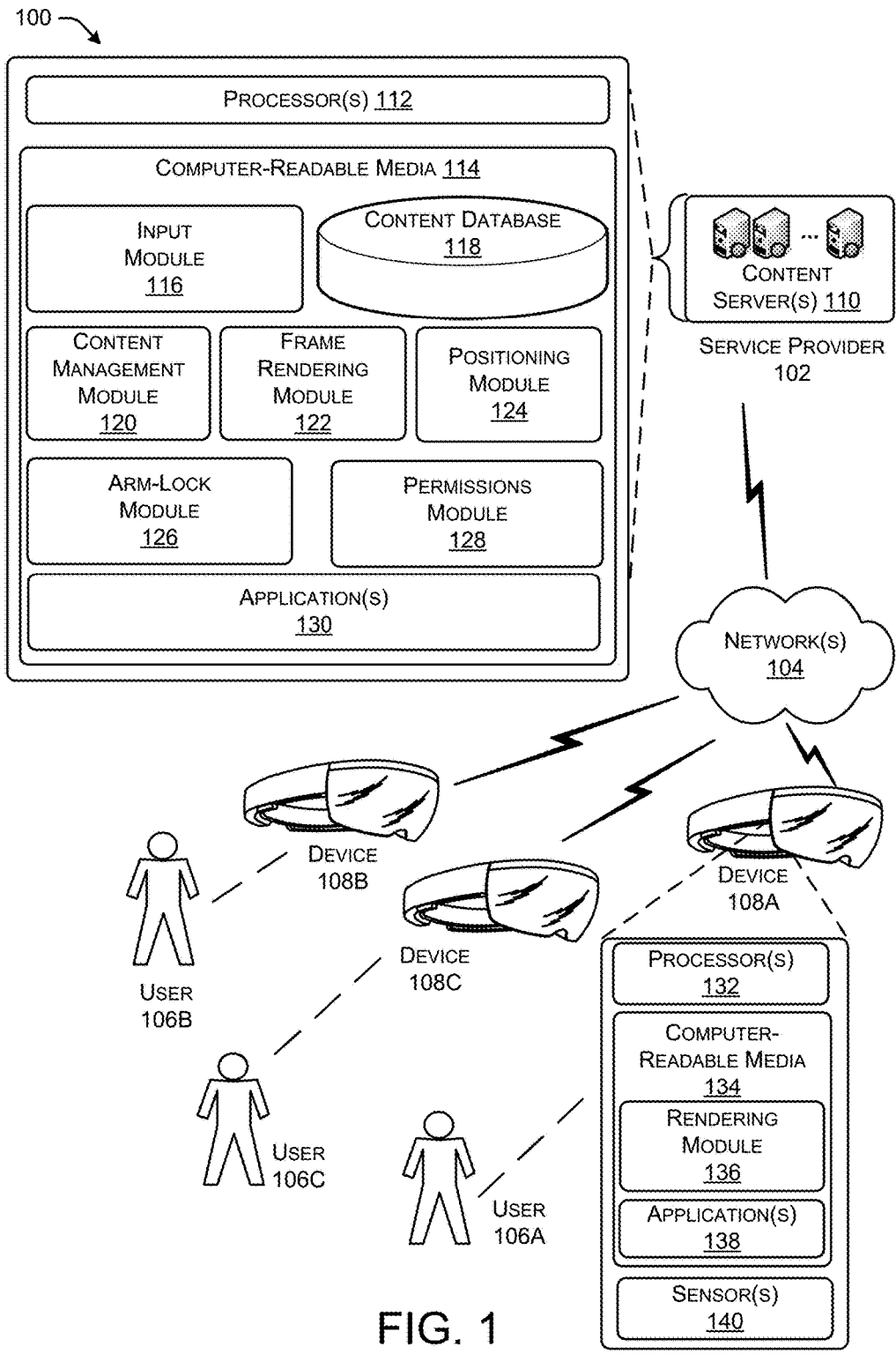
FIG. 1 is a schematic diagram showing an example environment for enabling one or more users in a mixed reality environment to interact with virtual content that is presented in the mixed reality environment.

This disclosure describes techniques for enabling two or more users in a mixed reality environment to collaborate with one another and/or with virtual content that is presented in the mixed reality environment. The techniques described herein can enhance mixed reality collaborations between users in mixed reality environments. In at least one example, the techniques are directed to mixed reality social collaborations between two or more users who are physically located in a same real scene, as described below, and the real scene may be unmarked (i.e., lacking predetermined and/or machine vision-specific markings for directing interactions between the two or more users). The techniques described herein can have various applications, including but not limited to, enabling users that are located in a same real scene to share virtual content and/or interact with the virtual content in a mixed reality environment via mixed reality display devices. The techniques described herein enable enhanced user interfaces to be presented on displays of mixed reality devices thereby enhancing mixed reality collaborations between users and the mixed reality experience.

For the purposes of this discussion, physical, real-world objects ("real objects") or physical, real-world people ("real people" and/or "real person") describe objects or people, respectively, that physically exist in a physical, real-world scene ("real scene") associated with a mixed reality display. Real objects and/or real people can move in and out of a field of view based on movement patterns of the real objects and/or movement of a user and/or user device. Virtual, computer-generated content ("virtual content" and/or "content items") can describe content that is generated by one or more computing devices to supplement the real scene in a user's field of view. In at least one example, virtual content can include one or more pixels each having a respective color or brightness that are collectively presented on a display such to represent a person, object, etc. that is not physically present in a real scene. That is, in at least one example, virtual content can include graphics that are representative of objects ("virtual objects"), people ("virtual people" and/or "virtual person"), biometric data, effects, etc. Virtual content can include two-dimensional (2D) graphics, three-dimensional (3D) objects, content associated with applications, etc. Virtual content can be rendered into the mixed reality environment via techniques described herein. In additional and/or alternative examples, virtual content can include computer-generated content such as sound, video, global positioning system (GPS), etc.

Mixed reality experiences offer different opportunities to affect self-perception and new ways for communication to occur. The techniques described herein enable users to interact with one another and/or with virtual content in mixed reality environments using mixed reality devices. In at least one example, the techniques described herein can enable conversational partners to share virtual content and/ or interact with virtual content in mixed reality environments. While the techniques described herein are directed to mixed reality environments, as described above, mixed reality may also be known as augmented reality. Accordingly, the techniques described herein should not be construed to exclude augmented reality environments.

In various examples described herein, a mixed or virtual reality system may incorporate any of a variety of programs or applications that host painting or drawing functions or operations. Such examples may be described by the term "HoloPaint," which may be considered a framework for painting or drawing collaboration in a mixed reality. Though, for convenience, the term "HoloPaint" is used in the following examples, claimed subject matter is not limited to any particular application or program performing the processes in the examples.

Painting or drawing functions or operations may be visually (e.g., virtually) rendered in a display of a mixed or virtual reality system. Moreover, these functions or operations may be visually applied to real objects or virtual objects displayed in the mixed or virtual reality system. Such a system may allow multiple collaborators to simultaneously look at the same results and separately, or collaboratively, perform painting or drawing functions or operations.

In particular examples, the main user interface in HoloPaint may be an arm-lock menu or toolkit, which a user can make appear or disappear by using voice commands (e.g., saying "menu" or "toolkit") or by arm movement. Though the term "arm-lock" is used herein, any other portion of a user, besides an arm, may be used as an object of reference for location of a menu. An arm-lock menu may comprise a virtual menu of menu items for controlling or operating various drawing or painting functions, among other things. The virtual menu may be displayed to appear to be at least partially surrounding one or both of the user's arms or wrists. As the arms or hands move, so does the virtual menu(s). This menu functionality is referred to as arm-lock.

In some examples, the menu or toolkit may appear virtually by default around the wrist(s) or arm(s) of the user, and the user can reposition the menu or toolkit by moving the wrist(s) or arm(s). Menu items of an arm-lock menu on one arm, for example, may be selected by a virtual touch, tap, or scroll of a finger(s) of the other arm.

The menu or toolkit may have several panes of buttons, including drawing and paint options, various input tools, as well as Help and Settings menus, for example. The actions of different buttons may include, but are not limited to, Settings, Move Tool, Selection Tool, Remove Tool, Evaluation Tool, Airbrush Tool, Spray Paint Tool, Splatter Tool, etc. Move Tool (e.g., arrows) may enable movement of objects on air taps. Subsequent to selection from the arm-lock menu, Move Tool may follow either the user's gaze or hand position, depending on the option chosen in Settings, for example. Selection Tool may allow the selection of multiple objects. Remove Tool (e.g., trash bin) may be used to delete objects on air tap.

Gestures and user input may be performed by any of a number of techniques. Selection of different menu options as well as objects may be performed by airtapping the options or objects once, for example. Airtapping may be a motion of a user's hand or finger(s) making a "tapping" motion in space (e.g., not necessarily against an object). In some cases, by default, the movement of 3D objects may be set to follow the user's gaze, but an option in a settings menu may allow movement to follow hand position. In this latter example, to stop movement, the user may gaze at the object being moved and air tap to place it. To perform rotations around the vertical axis, the user may first air tap an object (with the move tool selected), then pinch and move a hand left to right. In some examples, HoloPaint allows the use of a physical Bluetooth keyboard, in place of the virtual one.

In some examples, voice commands may be used as input. In the following, words in quotes represent spoken words. For example, "menu" (or "toolkit," "tools," etc.) may toggle the appearance of the arm-lock menu in the scene.

In some examples, HoloPaint may be implemented without a separate server. For example, HoloPaint may be run on either a single headset or be distributed on headsets of those sharing the experience.

In some examples, HoloPaint may be used for art expression or to produce holographic presentations, such as for PowerPoint® slides (e.g., future versions of PowerPoint® that may allow for holographic presentations). For instance, one can use techniques described herein to design, place, modify, and trigger-in-real-time elements such as text, charts, and other components that are useful in such a presentation to turn the physical space around a presenter into an active (e.g., animated or "alive") environment. In some cases, speech recognition can detect the presenter's voice and augment the physical space based, at least in part, on various aspects of the presenter's voice. Such aspects may include volume, tone, expression, spoken words or phrases, and so on. Listeners (e.g., viewers of the presentation) may interact with the content in the same space or in a remote location, for example.

In some examples, HoloPaint may be applied to various aspects of fashion design, body painting, and makeup. In particular examples, HoloPaint may be used to spray or splatter virtual paint around a virtual person (e.g., a mannequin) or a real person. Different textures may be applied on top of the person to simulate different materials, such as silk, leather, or different types of yarn, just to name a few examples. Using an RGB (red, green, blue) camera of a head mounted mixed reality display device, one may match colors that are already in a textile (real or virtual) or use any of a number of virtual brushes to create a palette that fits with a selected color. Note that, because of virtual/augmented/real worlds described herein, an object (e.g., a paint brush) may be a real object or a virtual object, though the context of its description may determine whether it is real or virtual. In some implementations, spray paint need not be a color but may be a physical attribute (e.g., a physical parameter), such as gravity, sound, heat, radiation, etc. For example, a user may paint a real or a virtual object with "gravity paint" to affect the virtual gravity of the object and its pull on other objects. The greater the amount of gravity paint applied, the greater the gravity of the object. In another example, a user may paint a real or virtual object with "heat paint" to affect the virtual heat of the object and its heating influence on other objects. The greater the amount (e.g., density) of heat paint applied, the hotter the object.

In some examples, HoloPaint may be applied to various aspects of photography. In particular examples, HoloPaint may be used for air painting, which may be a light painting photographic technique. Such air painting may be performed in real time. In such an application, for example, photographers could practice using various painting techniques with a head mounted mixed reality display device to investigate various types of light painting.

In some examples, HoloPaint may be applied to various aspects of interior design. In particular examples, HoloPaint may be used for virtually painting walls, surfaces, furniture, or various other room items to help interior designers or architects visualize their prototype design ideas. HoloPaint may also be used for creating shapes in the air of a mixed reality space. Colors from the real environment of the space may be selected to create a palette that can be applied to other parts of the space (real or virtual).

In some examples, HoloPaint may be applied to various aspects of measurements. In particular examples, HoloPaint may be used to determine metrics related to how creative content (e.g., painted, drawn, altered, or created objects in a mixed reality space) fits into the real world. For instance, such metrics may include volumes occupied by holograms, the percentage of walls or other objects in the mixed reality space that are painted (or were painted during an active session), and so on. In some examples, HoloPaint may be used to determine specific features, such as whether there are particular types of objects (e.g., persons, cats, furniture, walls, etc.) and the quantities of the objects in a mixed reality space.

In particular examples, HoloPaint may be used to determine metrics associated with a user of a head mounted mixed reality display device. For instance, such metrics may include number of calories expended by a user during a process of creating or modifying an object (e.g., creating a virtual piece of furniture, painting a wall, etc.). Measurements of metrics may be based, at least in part, on sensors such as, for instance, Microsoft Band®, which may be worn during the creating or modifying processes. In other examples, machine learning may be used to build a corpus of examples of people who have worn such sensors (e.g., Microsoft Band®). In a particular example, such machine learning may be used to estimate or predict caloric expenditure of users not wearing such sensors.

In some examples, HoloPaint may allow a user to splatter spray paint or air paint with spatialized audio forms. Such an audio tool may enhance the ability of a visually impaired person, for example, to understand the spatial extent of a real space. In this case, the visually impaired user may direct acoustic trials in the room as if it was an enhanced version of taps generated by a real cane. This could, for instance, be helpful in a complicated space, such as a relatively complex room with many internal surfaces, where a visually impaired user may have trouble navigating back to where some item like a water fountain was located.

Using the internal RGB camera and depth sensors of the HoloLens, for example, HoloPaint may approximate materials of selected surfaces of objects (real or virtual) and vary the sound depending on the material properties, for example. Similarly, using the depth information of the surface, HoloPaint may create more complicated sounds.

Illustrative Environments

FIG. 1 is a schematic diagram showing a particular example environment 100 for enabling users in a mixed reality environment to interact with one another and with virtual content that is presented in the mixed reality environment. Such an environment may enable a single user in the mixed reality environment to interact with virtual content that is presented in the mixed reality environment. More particularly, the example environment 100 can include a service provider 102, one or more networks 104, one or more users 106 (e.g., user 106A, user 106B, user 106C, etc.) and one or more devices 108 (e.g., device 108A, device 108B, device 108C, etc.) associated with the one or more users 106 (e.g., user 106A, user 106B, user 106C, etc.).

The service provider 102 can be any entity, server(s), platform, console, computer, etc., that facilitates two or more users 106 interacting in a mixed reality environment to enable individual users (e.g., user 106A, user 106B, and/or user 106C) of the two or more users 106 to interact with one another and/or with virtual content in the mixed reality environment. The service provider 102 can be implemented in a non-distributed computing environment or can be implemented in a distributed computing environment, possibly by running some modules on devices 108 or other remotely located devices. As shown, the service provider 102 can include one or more server(s) 110, which can include one or more processing unit(s) (e.g., processor(s) 112) and computer-readable media 114, such as memory. In various examples, the service provider 102 can access, receive, and/or determine authentication data from a device (e.g., device 108A), access content data associated with virtual content items, send rendering data associated with individual virtual content items to the device (e.g., device 108A), and cause the individual virtual content items to be presented on a display associated with the device (e.g., device 108A). For the purpose of this discussion, rendering data may include instructions for rendering a graphical representation of a virtual content item via a display of a device (e.g., device 108A). For instance, the rendering data may include instructions describing the geometry, viewpoint, texture, lighting, shading, etc. associated with a virtual content item. In some examples, the service provider 102 may send rendering data to devices 108 and the devices 108 can render the graphical representations via displays associated with the devices. In other examples, as described below, the service provider 102 may render frames and may send the frames to the devices 108 for presentation via the displays.

In some examples, the service provider 102 can receive frame requests from a device (e.g., device 108A) and can send frame messages to the device (e.g., device 108A) to mitigate latency caused by movement that occurs between sending the frame requests to the service provider 102 and receiving frame messages at and/or rendering corresponding frames via the device (e.g., device 108A). In at least one example, the service provider 102 can receive requests from individual devices (e.g., device 108A, device 108B, device 108C, etc.) of the one or more devices 108 associated with sharing virtual content items with other devices 108 (e.g., a request to view and/or access a virtual content items) and/or requests for performing interactions on the virtual content items, and the service provider 102 can synchronize communications and/or content rendering between the devices 108 to ensure that the virtual content items and interactions directed to the virtual content items are presented to corresponding users 106 at a substantially same time so that each of the users 106 has a same experience.

In some examples, the networks 104 can be any type of network known in the art, such as the Internet. Moreover, the devices 108 can communicatively couple to the networks 104 in any manner, such as by a global or local wired or wireless connection (e.g., local area network (LAN), intranet, Bluetooth, etc.). The networks 104 can facilitate communication between the server(s) 110 and the devices 108 associated with the one or more users 106.

Examples support scenarios where device(s) that can be included in the one or more server(s) 110 can include one or more computing devices that operate in a cluster or other clustered configuration to share resources, balance load, increase performance, provide fail-over support or redundancy, or for other purposes. Device(s) included in the one or more server(s) 110 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, game consoles, gaming devices, work stations, media players, digital video recorders (DVRs), set-top boxes, cameras, integrated components for inclusion in a computing device, appliances, or any other sort of computing device.

Device(s) that can be included in the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, an input module 116, a content database 118, a content management module 120, a frame rendering module 122, a positioning module 124, an arm-lock module 126, a permissions module 128, and one or more applications 130, and other modules, programs, or applications that are loadable and executable by the processor(s) 112.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Device(s) that can be included in the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a time-of-flight (TOF) camera, a depth sensor, a physiological sensor, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 112) can represent, for example, a CPU-type processing unit, a GPU-type processing unit, an HPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the server(s) 110 can include components that facilitate interaction between the service provider 102 and the one or more devices 108. The components can represent pieces of code executing on a computing device. For example, the computer-readable media 114 can include the input module 116, the content database 118, the content management module 120, the frame rendering module 122, the positioning module 124, the arm-lock module 126, the permissions module 128, and the one or more applications 130, etc. In at least some examples, the modules can be implemented as computer-readable instructions, various data structures, and so forth via at least one processing unit(s) (e.g., processor(s) 112) to enable two or more users 106 in a mixed reality environment to interact with one another and with virtual content that is presented in the mixed reality environment. Functionality to perform these operations can be included in multiple devices or a single device.

Depending on the exact configuration and type of the server(s) 110, the computer-readable media 114 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The input module 116 is configured to receive input from one or more devices 108 (e.g., device 108A, device 108B, device 108C, etc.) each corresponding to a user (e.g., user 106A, user 106B, user 106C, etc.). In at least one example, the input module 116 can access, receive, and/or determine authentication data from a device (e.g., device 108A). The authentication data can correspond to a user identification and password associated with a user (e.g., user 106A) associated with the device (e.g., device 108A), biometric identification associated with a user (e.g., user 106A) associated with the device (e.g., device 108A), etc. In at least one example, the authentication data can be leveraged to determine presence of corresponding devices 108 in a mixed reality environment. For the purpose of this discussion, presence may indicate that a device (e.g., device 108A) is located in and/or interacting with other devices (e.g., device 108B, device 108C, etc.) and/or virtual content in a mixed reality environment.

In additional and/or alternative examples, the authentication data can be utilized to determine virtual content items that are available to the user (e.g., user 106A) and the user's (e.g., user 106A) permissions corresponding to viewing and/or interacting with each of the virtual content items. In at least one example, the authentication data can be utilized for causing virtual content items to be presented in a same mixed reality environment where a user (e.g. user 106A) previously left the virtual content item and in a same position where the user (e.g., user 106A) previously left the virtual content item (e.g., if a user (e.g., user 106A) removes his or her head mounted display device (e.g., device 108A), turns off his or her device (e.g., device 108A), etc.).

The content database 118 is configured to store content data associated with virtual content. Content data associated with the individual virtual content items can be stored in the content database 118. Each individual virtual content item can be associated with data indicating an owner identification, a content identification, and permissions (i.e., permissions data). Data associated with an owner of a virtual content item may identify a user (e.g., user 106A, user 106B, user 106C, etc.) that generated and/or has control over the permissions associated with a virtual content item. That is, an owner of a virtual content item can correspond to a user (e.g., user 106A, user 106B, user 106C, etc.) that generated and/or has control over the permissions associated with the virtual content item. Content identification can correspond to data indicating the content associated with the virtual content item. Permissions data can include information indicating which users 106 and/or corresponding devices 108 have permission to view and/or interact with the virtual content in the mixed reality environment (i.e., which users 106 the owner has shared the virtual content with). For instance, the permission data can reflect whether a virtual content item is public, private, visible by some devices (e.g., device 108A, device 108B, and/or device 108C), etc. Additionally and/or alternatively, the permissions data can indicate which interactions particular users 106 can perform and/or which interactions particular users 106 are prohibited from performing. In some examples, the permissions data can be based on input from the owner of the corresponding virtual content item, as described below.

In at least one example, the user (e.g., user 106A) associated with a device (e.g., device 108A) that initially requests the virtual content item can be the owner of the virtual content item such that he or she can modify the permissions associated with the virtual content item. In at least one example, the owner of the virtual content item can determine which other users (e.g., user 106B and/or user 106C) can view the virtual content item (i.e., whether the virtual content item is visible to the other users 106). For instance, in an example, an owner of a virtual content item can utilize a menu (e.g., a dropdown menu, a radial menu, etc.) or other mechanisms to share the virtual content item with all users 106 in a same mixed reality environment (i.e., make the virtual content item public), share the virtual content item with some users (e.g., user 106A, user 106B, and/or user 106C) in the same mixed reality environment, or not share the virtual content item with any other users 106 (i.e., make the virtual content item private). That is, in some examples, the owner of the virtual content item can determine whether a virtual content item is visible or not visible via other devices 108. In other examples, the owner of the virtual content item can determine which other users (e.g., user 106B and/or user 106C) can interact with the virtual content item via corresponding devices (e.g., device 108B and/or device 108C) and/or which interactions are permitted.

The content management module 120 manages the ownership of virtual content items and can leverage the permissions data to determine which of the other users (e.g., user 106B and/or user 106C) and/or corresponding devices (e.g., device 106B and/or user 106C) have permission to view individual virtual content items and/or interact with individual virtual content items. That is, the content management module 120 may access the content data to determine devices 108 with which a content item has been shared and/or interactions available for each of the devices 108. As described above, the content data may include permissions data which indicates whether a content item is public, private, or has been shared with one or more devices (e.g., device 108B, device 108C, etc.) and/or interactions available for each of the devices 108.

In various examples, the frame rendering module 122 can receive frame request messages from a requesting device (e.g., device 108A) of the one or more devices 108. Frame request messages can include, but are not limited to, pose information associated with each eye of a user (e.g., user 106A), a timestamp, a desired resolution, and a desired field of view. Pose information can include a position and a rotation relative to a common coordinate system (i.e., a coordinate system that is consistently defined for both the device (e.g., device 108A) and the service provider 102), which for the purpose of this discussion, may be referred to as the worldspace coordinate system. A time stamp may represent a time in which the frame request message was generated and/or sent. A desired resolution may be a desired level of detail associated with rendered virtual content (i.e., a higher resolution amounts to more detail in the virtual content). In some examples, resolution can describe a pixel count in a digital image. A desired field of view may describe an extent to which the observable world is desired to be seen at any given time through a display of a mixed reality display device (e.g., device 108A, device 108B, device 108C, etc.). In some examples, field of view may describe an angle of view.

The frame request message can be processed by the frame rendering module 122 to enable virtual content to be rendered from a particular user's point of view (e.g., user 106A). The frame rendering module 122 may generate a frame message responsive to a frame request message. The resulting frame message can include a same timestamp which was sent in the associated frame request message, the determined resolution, the determined field of view, the pose of each eye as sent in the associated frame request message, and the render distance. In some examples, the frame rendering module 122 can be configured to render stereo images (one image per eye of a user (e.g., user 106A)) for each frame request message. The stereo images may represent frames. A first image of the stereo images can correspond to the left eye of a user (e.g., user 106A) and a second image of the stereo images can correspond to a right eye of a user (e.g., user 106A). In at least one example, a frame message may include rendered stereo images. In some examples, the frame rendering module 122 can render a mixed reality scene at a different resolution or field of view than the requested desired values. The resulting resolution and/or field of view may be associated with the frame message, described above. The frame rendering module 122 can send the frame message to the requesting device (e.g., device 108A).

The requesting device (e.g., device 108A) can receive the frame message, process the received frame message, and render the stereo images as two quads, or other virtual surfaces, positioned in worldspace in front of a virtual stereo camera associated with the requesting device (e.g., device 108A). In an example, the left stereo image can be textured onto the left quad and the right stereo image can be textured onto the right quad. In such an example, the left quad may be rendered by a left camera associated with a device (e.g., device 108A) and the right quad may be rendered by a right camera associated with a device (e.g., device 108A). Each quad can be positioned in worldspace in front of each eye as specified in the frame message, such that each quad's normal vector is aligned with the eye direction vector. Each quad can be sized such that it can fill the frustum defined by each eye in the received frame message, which can be defined by the combination of the determined field of view and the eye pose information in the frame message. The requesting device (e.g., device 108A), can continue to render both the left and right quads as the user (e.g., user 106A) moves about in worldspace (with the quads fixed in worldspace), until the next frame request message is sent to the frame rendering module 122 and the responsive frame message is received by the requesting device (e.g., device 108A). Based at least in part on receiving the next frame message, the left and right quads can be repositioned and retextured as described according to the data in the frame message (e.g., a same timestamp which was sent in the associated frame request message, the determined resolution, the determined field of view, the pose of each eye as sent in the associated frame request message, and the render distance).

Before the next frame message is received by the requesting device (e.g., 108A), any movement of the user (e.g., user 106A), and corresponding device (e.g., device 108A), relative to the left and right quads (which are fixed in worldspace) can appear as a corresponding and opposite movement of the left and right quads in screen-space (e.g., relative to the screen). For the purpose of this discussion, screen-space can represent the space defined by the display 204 associated with a device (e.g., device 108A). For each frame message, there can be an infinite number of possible valid positions and sizes for the left and right quads defined by a proportional relationship between the worldspace distance from each quad to each eye and the worldspace size of each quad (i.e., the further away these quads are, the larger they may be in order to fill each eye frustum appropriately). The amount of movement in screen-space can be proportionately affected by the distance at which these quads are positioned relative to the user (e.g., user 106A) (i.e., the parallax effect).

To create more natural movement of these quads in screen-space (between frame messages) the distance of these quads (from their associated eye positions) can be determined by using a heuristic to approximate an appropriate distance of the quads. An example of a heuristic can be to calculate the average distance of each virtual object which is visible in the rendered frame. Another example can be to calculate the average distance of each pixel that is visible in the frame rendering module 122. An additional and/or alternative example can be to calculate the distance of the most salient object (or the most salient pixels) in the scene (as determined by any number of factors, including gaze tracking). The frame rendering module 122 can use any of these (or any other) heuristics to calculate a render distance for each frame, which can also be sent in each frame message. This render distance can then be used to define a specific position and size at which the requesting device (e.g., device 108A) can position the left and right quads.

In at least one example, to calculate an average pixel distance, the frame rendering module 122 can render a depth buffer for each frame from a center eye anchor (i.e., the center between both eyes of a user (e.g., user 106A)). In the at least one example, the depth buffer can be rendered using a shading device ("shader") that outputs the pixel depth mapped to a value between 0 and 1 (linearly or otherwise), with 0 being the camera's near plane, and 1 being the camera's far plane. As a non-limiting example, a depth value can be encoded either into one (8-bit) channel of the output buffer, such that the depth value is encoded with a resolution of 255 values (1 byte), or alternatively all four channels in a 32-bit buffer can be leveraged to encode a 32-bit floating point value representing the same depth value (between 0 and 1) at 32-bit precision for each pixel. In the non-limiting example, the resulting depth buffer values (once decoded into a standard 32-bit floating point representation) can be used to determine the worldspace distance between each pixel and the camera which was used to render the depth buffer. In the non-limiting example, the worldspace distance for each pixel is determined by subtracting the near plane distance from the far plane distance, multiplying that difference by the pixel's depth value, and then adding the near plane distance to the result. The frame rendering module 122 can then calculate an average pixel distance by averaging the worldspace distance of each pixel. This average pixel distance can be included in the frame message as the render distance.

In some examples, the frame rendering module 122 may send the depth buffer data in the frame message to the requesting device (e.g., device 108A) and a parallax shader can be used by the requesting device (e.g., device 108A) to approximate movement of the user (e.g., user 106A). In such examples, the frame message may include additional and/or alternative data (e.g., the depth buffer, either for each eye, or for the center eye anchor), and the rendering module 136 may render the virtual content items in the mixed reality environment. In such examples, the frame rendering module 122 may not calculate the average pixel distance and/or a saliency map, as described above.

In at least some examples, the frame rendering module 122 may access the content data to determine which virtual content items a user (e.g., user 106A) has open and/or which virtual content items the user (e.g., user 106A) has shared with other users (e.g., user 106B and/or user 106C).

The positioning module 124 can send instructions associated with rendering virtual content on a display of a device (e.g., device 108A) to the device (e.g., device 108A). That is, the positioning module 124 can send instructions associated with a position and/or placement of virtual content in a mixed reality environment. The instructions can be determined by the content data, and in some examples, may be associated with the rendering data, described below.

Arm-lock module 126 may, in part, allow for rendering an arm-lock menu. For example, as described below, arm-lock module 126 may use sensor information to determine a location of a portion of a user of a mixed reality display device relative to a mixed reality. Arm-lock module 126 may selectively display or hide, via the display of the mixed reality display device, a user-interface menu locked to the portion (e.g., arm or wrist) of the user based, at least in part, on the location of the portion of the user relative to the mixed reality display device.

Permissions module 128 is configured to determine whether an interaction between a first user (e.g., user 106A) and the second user (e.g., user 106B) is permitted, authorizations associated with individual users (e.g., user 106A, user 106B, user 106C, etc.), etc. In at least one example, the permissions module 128 can store permissions data corresponding to instructions associated with individual users 106. The instructions can indicate what interactions that a particular user (e.g., user 106A, user 106B, or user 106C) permits another user (e.g., user 106A, user 106B, or user 106C) to have with the particular user (e.g., user 106A, user 106B, or user 106C) and/or view of the particular user (e.g., user 106A, user 106B, or user 106C). Additionally and/or alternatively, permission data can indicate types of information (e.g., metadata) a particular user (e.g., user 106A, user 106B, or user 106C) is permitted to see. The permissions data can be mapped to unique identifiers that are stored in the database 118, described below.

Applications (e.g., application(s) 130) are created by programmers to fulfill specific tasks. For example, applications (e.g., application(s) 130) can provide utility, entertainment, educational, and/or productivity functionalities to users 106 of devices 108. Applications (e.g., application(s) 130) can be built into a device (e.g., telecommunication, text message, clock, camera, etc.) or can be customized (e.g., games, news, transportation schedules, online shopping, etc.). Application(s) 130 can provide conversational partners (e.g., two or more users 106) various functionalities, including but not limited to, sharing and/or interacting with virtual content items in a mixed reality environment. In at least some examples, the virtual content items can be applications and/or can be associated with the applications.

In some examples, the one or more users 106 can operate corresponding devices 108 (e.g., user devices) to perform various functions associated with the devices 108. Device(s) 108 can represent a diverse variety of device types and are not limited to any particular type of device. Examples of device(s) 108 can include but are not limited to mobile computers, embedded computers, or combinations thereof.

Example mobile computers can include laptop computers, tablet computers, wearable computers, implanted computing devices, telecommunication devices, automotive computers, portable gaming devices, media players, cameras, or the like. Example embedded computers can include network enabled televisions, integrated components for inclusion in a computing device, appliances, microcontrollers, digital signal processors, or any other sort of processing device, or the like. In at least one example, the devices 108 can include mixed reality devices (e.g., CANON® MREAL® System. MICROSOFT® HOLOLENS®, etc.). Mixed reality devices can include one or more sensors and a mixed reality display, as described below in the context of FIG. 2. In FIG. 1, device 108A, device 108B, and device 108C are wearable computers (e.g., head mount devices); however, the devices 108 can be any other device as described above. In at least one example, the devices 108 can be untethered such that they are not physically connected to external devices. However, the devices 108 can be communicatively coupled to external devices, as described herein.

Device(s) 108 can include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a depth sensor, a physiological sensor, and the like) and/or output peripheral devices (e.g., a display, a printer, audio speakers, a haptic output, and the like). As described above, in some examples, the I/O devices can be integrated into the one or more server(s) 110 and/or other machines and/or devices 108. In other examples, the one or more input peripheral devices can be communicatively coupled to the one or more server(s) 110 and/or other machines and/or devices 108. The one or more input peripheral devices can be associated with a single device (e.g., MICROSOFT® KINECT®, INTEL® Perceptual Computing SDK 2013, LEAP MOTION®, etc.) or separate devices.

Figure 2:
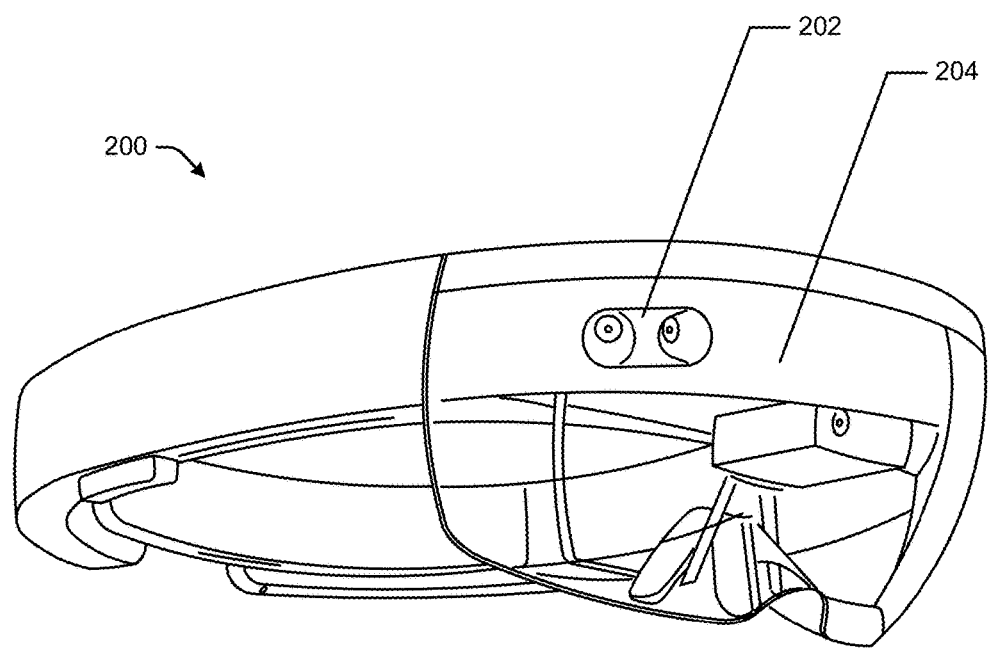
FIG. 2 is a schematic diagram showing an example of a head mounted mixed reality display device.

FIG. 2 is a schematic diagram showing an example of a head mounted mixed reality display device 200. As illustrated in FIG. 2, the head mounted mixed reality display device 200 can include one or more sensors 202 and a display 204. The one or more sensors 202 can reconstruct the real scene in which the one or more users 106 are physically located and track real people and/or objects within the real scene. The one or more sensors 202 can include cameras and/or sensors. The cameras can include image cameras, stereoscopic cameras, etc. The sensors can include depth sensors, color sensors, acoustic sensors, optical sensors, pattern sensors, gravity sensors, etc. The cameras and/or sensors can output streams of data in substantially real time. The data can include moving image data and/or still image data (e.g., tracking data) representative of movement of real people and/or real objects in a real scene that is observable by the cameras and/or sensors. Additionally, the data can include depth data.

Tracking devices can output the moving image data and/or still image data (e.g., tracking data) representative of movement of real people and/or real objects in a real scene. Tracking devices can include optical tracking devices (e.g., VICON®, OPTITRACK®), magnetic tracking devices, acoustic tracking devices, gyroscopic tracking devices, mechanical tracking systems, depth cameras (e.g., KINECT®, INTEL® RealSense, etc.), inertial sensors (e.g., INTERSENSE®, XSENS, etc.), combinations of the foregoing, etc. The tracking devices can output streams of volumetric data, skeletal data, perspective data, etc. in substantially real time. The streams of volumetric data, skeletal data, perspective data, etc. can be received by the input module 116 in substantially real time. Volumetric data can correspond to a volume of space occupied by a body of a user (e.g., user 106A, user 106B, or user 106C). Skeletal data can correspond to data used to approximate a skeleton, in some examples, corresponding to a body of a user (e.g., user 106A, user 106B, or user 106C), and track the movement of the skeleton over time. The skeleton corresponding to the body of the user (e.g., user 106A, user 106B, or user 106C) can include an array of nodes that correspond to a plurality of human joints (e.g., elbow, knee, hip, etc.) that are connected to represent a human body. Perspective data can correspond to data collected from two or more perspectives that can be used to determine an outline of a body of a user (e.g., user 106A, user 106B, or user 106C) from a particular perspective.

Combinations of the volumetric data, the skeletal data, and the perspective data can be used to determine body representations corresponding to users 106. The body representations can approximate a body shape of a user (e.g., user 106A, user 106B, or user 106C). That is, volumetric data associated with a particular user (e.g., user 106A), skeletal data associated with a particular user (e.g., user 106A), and perspective data associated with a particular user (e.g., user 106A) can be used to determine a body representation that represents the particular user (e.g., user 106A). The body representations can be used by the rendering module 136 to determine where to render virtual content in the 3D coordinate system (e.g. worldspace) corresponding to the real space where the particular user (e.g., user 106A) is physically located.

The depth data can represent distances between real objects in a real scene observable by sensors and/or cameras and the sensors and/or cameras. The depth data can be based at least in part on infrared (IR) data, trulight data, stereoscopic data, light and/or pattern projection data, gravity data, acoustic data, etc. In at least one example, the stream of depth data can be derived from IR sensors (e.g., time of flight, etc.) and can be represented as a point cloud reflective of the real scene. The point cloud can represent a set of data points or depth pixels associated with surfaces of real objects and/or the real scene configured in a 3D coordinate system (e.g., worldspace). The depth pixels can be mapped into a grid. The grid of depth pixels can indicate a distance between real objects in the real scene and the cameras and/or sensors. The grid of depth pixels that correspond to the volume of space that is observable from the cameras and/or sensors can be called a depth space. The depth space can be utilized by the rendering module 136 (in the devices 108) for determining how to render virtual content in the mixed reality display.

In some examples, the one or more sensors 202 can be integrated into the head mounted mixed reality display device 200 and/or devices 108. In such examples, the one or more sensors 202 correspond to inside-out sensing sensors; that is, sensors that capture information from a first person perspective. In additional or alternative examples, the one or more sensors can be external to the head mounted mixed reality display device 200 and/or devices 108. In such examples, the one or more sensors 202 can be arranged in a room (e.g., placed in various positions throughout the room), associated with a device, etc. Such sensors can correspond to outside-in sensing sensors; that is, sensors that capture information from a third person perspective. In yet another example, the sensors can be external to the head mounted mixed reality display device 200 but can be associated with one or more wearable devices configured to collect data associated with the user (e.g., user 106A, user 106B, or user 106C).

The display 204 can present visual content to the one or more users 106 in a mixed reality environment. In some examples, the display 204 can present the mixed reality environment to a user (e.g., user 106A) in a spatial region that occupies an area that is substantially coextensive with the user's (e.g., user 106A) actual field of vision. In other examples, the display 204 can present the mixed reality environment to the user (e.g., user 106A) in a spatial region that occupies a lesser portion of a user's (e.g., user 106A) actual field of vision. The display 204 can include a transparent display that enables a user (e.g., user 106A) to view the real scene where he or she is physically located. Transparent displays can include optical see-through displays where the user (e.g., user 106A) sees the real scene he or she is physically present in directly, video see-through displays where the user (e.g., user 106A) observes the real scene in a video image acquired from a mounted camera, etc. The display 204 can present the virtual content to the user (e.g., user 106A) such that the virtual content augments the real scene where the user (e.g., user 106A) is physically located within the spatial region.

The virtual content can appear differently to different users (e.g., user 106A, user 106B, and/or user 106C) based on the users' perspectives and/or the location of the corresponding devices (e.g., device 108A, device 108B, and/or device 108C). For instance, the size of a virtual content item can be different based on a proximity of a user (e.g., user 106A, user 106B, and/or user 106C) and/or device (e.g., device 108A, device 108B, and/or device 108C) to the virtual content item. Additionally or alternatively, the shape of the virtual content item can be different based on the vantage point of a user (e.g., user 106A, user 106B, and/or user 106C) and/or device (e.g., device 108A, device 108B, and/or device 108C). For instance, a virtual content item can have a first shape when a user (e.g., user 106A, user 106B, and/or user 106C) and/or device (e.g., device 108A, device 108B, and/or device 108C) is looking at the virtual content item straight on and can have a second shape when a user (e.g., user 106A, user 106B, and/or user 106C) and/or device (e.g., device 108A, device 108B, and/or device 108C) is looking at the virtual item from the side.

The devices 108 can include one or more processing unit(s) (e.g., processor(s) 132), computer-readable media 134, at least including a rendering module 136 and one or more applications 138. The devices 108 can also include one or more sensors 140, which may be able to sense any of a variety of physical parameters of a real object, and portions thereof. For example, sensor(s) 140 may be able to sense or detect color, texture (smoothness, roughness, porous, etc.), hue, albedo, brightness, fluorescence, transmissivity, reflectivity, size, volume, relative height, sound intensity or frequency, heat, temperature, magnetic field, electric field, gravitational field, radioactivity, resonance fields, kinematic (e.g., velocity, acceleration, rotation, etc.) vectors and/or magnitudes, just to name a few examples. For instance, sensor 140 may be a gravitometer, a magnetometer, a radiometer, a directional microphone, an optical thermometer (e.g. detects infrared energy), and so on. In some instances, sensor 140 may be a camera that can capture images at various times. Processor 112 and/or 132 may compare images of different times to determine kinematic vectors. In some cases, processor 112 and/or 132 may compare measurements (e.g., heat, magnetic field, color, volume, and so on) captured by sensor(s) 140 at different times to determine changes of parameters.

The one or more processing unit(s) (e.g., processor(s) 132) can represent same units and/or perform same functions as processor(s) 112, described above. Computer-readable media 134 can represent computer-readable media 114 as described above. Computer-readable media 134 can include components that facilitate interaction between the service provider 102 and the one or more devices 108. The components can represent pieces of code executing on a computing device, as described above. Computer-readable media 134 can include at least a rendering module 136. The rendering module 136 can receive content data from the service provider 102 and can render virtual content items on the display 204 of the device (e.g., device 108A, device 108B, or device 108C). In at least one example, the rendering module 136 can leverage a standard graphics rendering pipeline for rendering virtual content on the display 204. In some examples, the rendering module 136 can receive previously rendered frames (e.g., associated with frame messages) from the service provider 102 to correct for potential latency and/or render correct perspectives based on the position of the user (e.g., user 106A) in worldspace. In other examples, the rendering module 136 may receive rendering data for rendering the virtual content items locally. Application(s) 138 can correspond to same applications as application(s) 130 or different applications.

Figure 3:
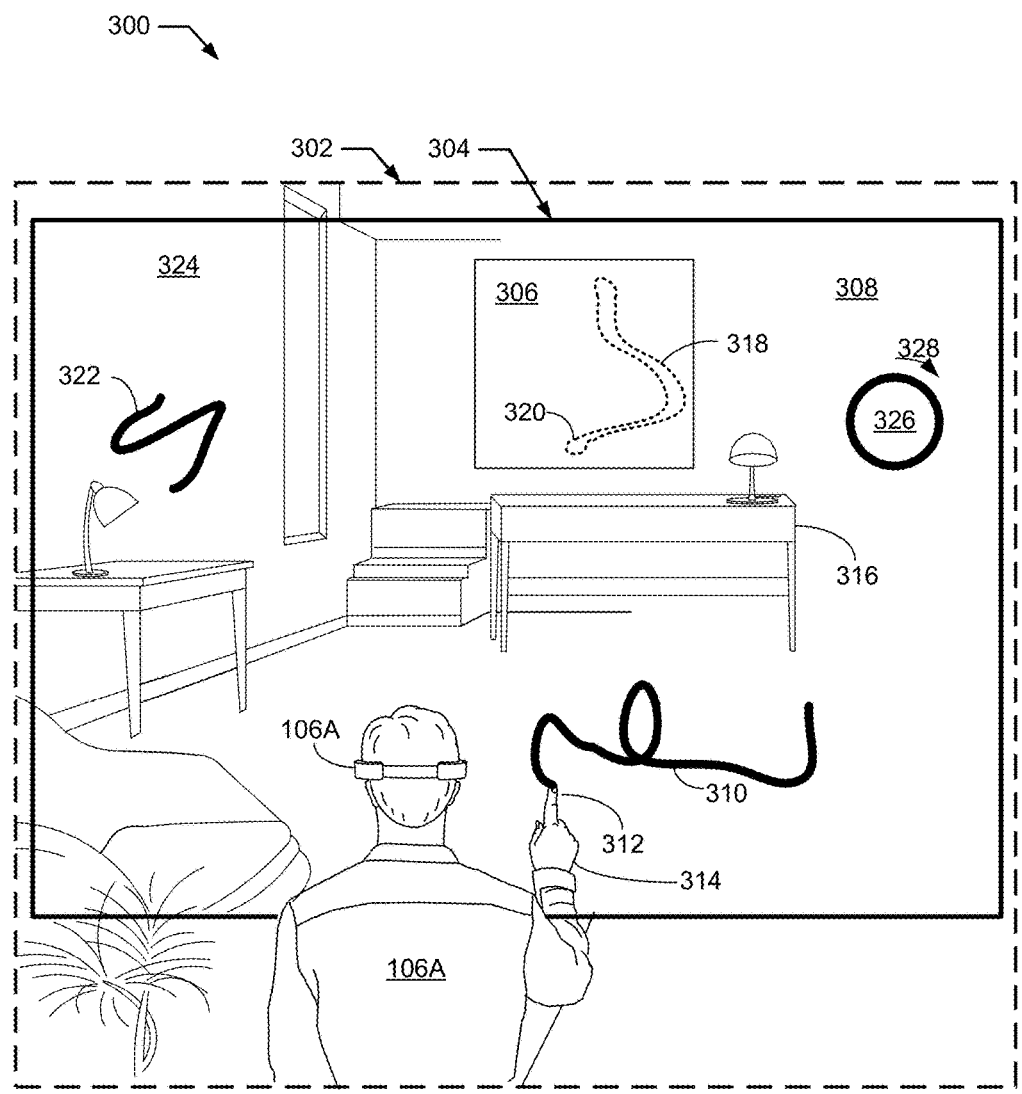
FIG. 3 is a schematic diagram showing an example of a view of a mixed reality environment wherein a user can interact with virtual content that is presented in the mixed reality environment.

FIG. 3 is a schematic diagram showing an example of a view 300 (e.g., a front view) of a mixed reality environment wherein a user (e.g., user 106A) can interact with real content and virtual content that is presented in the mixed reality environment. The area depicted in the dashed lines corresponds to a real scene 302 in which the user is physically present. In some examples, another user may be remotely located and can be virtually present in the mixed reality environment (e.g., as an avatar, a reconstructed 3D model that has been captured using various sensors and/or cameras (e.g., KINECT® or TOF camera)). That is, the device (e.g., device 108A) corresponding to the user (e.g., user 106A) may receive streaming data to render the remotely located user (e.g., user 106B) in the mixed reality environment presented by the device (e.g., device 108A). The area depicted in the solid black line corresponds to the spatial region 304 in which the mixed reality environment is visible to the user via a display 204 of a corresponding device (e.g., device 108A). As described above, in some examples, the spatial region can occupy an area that is substantially coextensive with a user's actual field of vision and in other examples, the spatial region can occupy a lesser portion of a user's actual field of vision. Additional users (e.g., user 106C, etc.) may be present but not visible in the spatial region 304.

In the example of FIG. 3, the user may be viewing various virtual content items in the user's mixed reality environment via a display 204 of his device (e.g., device 108A). As described below, the user may have authenticated his device (e.g., device 108A). Based at least in part on authenticating the user's device, the rendering module 136 associated with the device may render the various virtual content items on the display 204 corresponding to the device. As a non-limiting example, the user may view a graphical representation of a surface 306, which may be a real object (e.g., picture frame), or may be a virtual object superimposed onto a real surface, such as a wall 308.

In some examples, user 106A may virtually paint in the air of spatial region 304. The user may create 3D representations 310 of trails of light, texture, and colors in the special region without a need for post-production. In some examples, the user may draw using the tip of their index finger. In such cases, the size of the "paint brush" may be varied by adding more fingers. For example, two fingers may make the thickness of the brush bigger than for one finger, three fingers may make the thickness of the brush bigger than for two fingers, and so on.

In some examples, the drawings need not be logically structured, but instead may be a result of the "flow" of the user (e.g., an artist or other such creative person). Accordingly, painting or drawing results may vary among users.

In some examples, a user may air tap with an index finger 312 once to start drawing (e.g., to enter a drawing mode), and air tap once more to stop drawing (e.g., to exit the drawing mode). The drawing may follow the position of index finger 312. The user may also paint with a whole hand 314 while touching a surface or while in the air. Instead of drawing with hand gestures, a peripheral pen or similar tool (not illustrated in FIG. 3) may be used to draw. Such a tool or device may be passive, not having any kind of electronics, and may include a reflective marker for tracking its position, which may be used by HoloPaint to determine where to place a drawn line or object, for example. In some cases, a camera, such as on the HoloLens, may allow HoloPaint to perform image recognition and to detect where the user is drawing. In some examples, the peripheral pen or similar tool may have embedded electronic that may allow for estimating a position by using an accelerometer and gyroscope. In some examples, a user-wearable sensor device (e.g., Microsoft Band®) may be used to track hand position, rotation, and acceleration, and may provide biometric data to allow for the drawings to change texture, color, and shapes, based, at least in part, on the user's physical and emotional state. Note, for example, that 3D representation 310 (e.g., a thick line) may have changing colors, thicknesses, textures, and so on along its length.

In some examples, painters, photographers, and designers may perform various artistic techniques using HoloPaint. In the case of air painting, the aesthetical appearance may mimic the photographic technique of light painting or light drawing, where the user can create a painting with a source of light with a relatively long exposure. 3D representations of various textures may be created in real time using mixed reality. Transparencies and superposition of textures on top of (e.g., overlaying) a physical space may be achieved by moving index finger 312 around the 3D space. HoloPaint may also allow for painting of surfaces like tables or other furniture 316.

In some examples, any of a number of types of virtual brushes may be used to paint or top draw. User 106A may use such brushes to apply real or fictional textures, materials, and patterns. Each brush may paint a unique 3D line (or area, such as a swath or wide line) having a particular texture and shape. In some examples, a brush may paint a corresponding metaphor that leaves a history behind and reflects an expression or feeling of the user. Some examples of virtual brushes include natural bristle brushes to apply watercolor, chalkboard, acrylic paint, marker, pen, and so on; special effects and animations brushes to perform light painting, or to apply glow, sparkling materials, and animated textures and particles; fantasy brushes to apply surreal effects including randomized colors and textures with various lighting; and material brushes for applying textures such as cloth and textiles, sponge, and reflective materials for metals, just to name a few examples. Additionally, colors, textures, hues, line thicknesses, and so on may be individually selected or modified for brushes by selecting or operating menu items or other user interface, for example.

In some examples, a user may select an option for spray painting. The user may spray on surfaces, objects, walls, etc. Spatial mapping may be used to track the environment and determine the color and size of the paint area as well as determine various properties connected to the paint. For instance, user 106A may create a spray paint representation 318, comprising trails of light, texture, and colors on surface 306. In some examples, the user may draw using the tip of their index finger or a spray paint tool. In such cases, the size and other features of the spray paint representation 318 may be varied based, at least in part, on distance and orientation of the spray paint tool with respect to the surface being painted, as described in detail below. In some examples, the duration that the spray paint tool is held in a particular direction at a surface may determine color density, paint area or line width, and so on. For a particular example, spray paint representation 318 includes a relatively wide region 320, where the spray paint tool may have been held for a relatively long duration as compared to the time that the spray paint tool was held over the remaining portions of spray paint representation 318.

3D representation 310 is an example of a drawing produced in air. In contrast, 3D representation 322 is an example of a drawing produced on a surface 324. Such surfaces may be drawn upon using the tip of an index finger. In such cases, the size of the "paint brush" may be varied by adding more fingers. For example, two fingers may make the thickness of the brush bigger than for one finger, three fingers may make the thickness of the brush bigger than for two fingers, and so on.

In some examples, using HoloPaint, a user may generate a shape 326 by painting in the air. The shape may then be placed into motion, such as a rotation depicted by arrow 328. For example, the user may impart a spinning motion by brushing the user's hand against the object in a generally tangential direction. Such a drawing or 3D object may be resized using two hands as if it were a multi-touch gesture. Similarly, a user may zoom in or zoom out in a 3D scenario to get closer or farther away from the object.

The holograms may be sculpted with hands, similarly to the ZBRUSH® program or handcraft ceramics. The user can create deformed objects and make them twirl and deform, for example. Air painting lines may be deformed as if they were Bezier curves. If a user paints in the air, tubular structures may be produced. Since the objects may be in 3D, they could have functions that are different from 2D paint. For instance, a user may introduce small virtual balls that roll within the tubular objects, like pin balls in 3D mazes, or virtual fluids that flow. Animations can be applied as well in a time loop that auto-closes through interpolation so that the repetition doesn't have a discontinuity.

In some examples, HoloPaint may allow for painting real objects, such as spray painting or brush painting. A user may subsequently be able to pick up and move the "shell" of the painted objects. Such a shell may comprise the union of a sprayed/splattered/painted object as if the real world object had been a mold. This "shell" may comprise a 3D mesh of the real object or surface, which may have been previously mapped using a spatial mapping of HoloLens.

Splattering (or spraying or brushing) paint onto an object may be part of a process of physical modeling of 3D painting, so that a user can treat the object of the real world as a mold for papier-mâché, stalactites, and other sculptural experiences. This process may include materials modeling so that virtual materials drip, dry, mix, and so on (such as in a physical modeling paint program Fresh Paint®).

In some examples, HoloPaint can save and recall 3D virtual decoration of the space and later use the physical modeling by the 3D painting to create virtual miniatures of the virtual space. Such virtual miniatures may be used as decoration, sculptures floating in air, or may rest on surfaces of a table top, etc. In some cases, HoloPaint may detect, quantify, or record how similar the original room (in which the decoration was created) is to the room modified by the virtual miniatures. Such detection may be performed, for example, by comparing spatial mapping of the two rooms (e.g., before and after) and extracting the 3D meshes and vertices of each room.

In some examples, HoloPaint may use any of a variety of sensors to determine parameters of real objects (or portions thereof) in a mixed environment. Parameters of real objects may be stored in memory for future use. Parameters may include surface parameters, such as color, texture (smoothness, roughness, porous, etc.), hue, albedo (e.g., the "whiteness" of a surface or reflection coefficient), brightness, and transmissivity, just to name a few examples. Other parameters may be size, volume, relative height, and so on. Still other parameters may include sound intensity or frequency, heat, temperature, fluorescence, magnetic field, electric field, gravitational field, radioactivity, resonance fields, kinematic (e.g., velocity, acceleration, rotation, etc.) vectors and/or magnitudes, just to name a few examples. In some examples, analysis of captured images may be used to determine some parameters, while analysis of sensor data may be used to determine other parameters. In other examples, such parameters of real objects in a scene may be sensed by various types of sensors so that, for various resolutions, the temperature of each of a plurality of portions of the objects may be measured and recorded for subsequent processes or applications, as described below.

The parameters of real objects may be applied by painting or drawing, for example, to interactions in the mixed environment between the real objects and virtual objects or actions. For instance, real objects such as a red apple resting on a white table may be virtually painted with a blue paint. Based on the colors of the real objects, HoloPaint may display the blue paint on the red apple as purple (blue plus red) and may display the blue paint on the white table as blue (blue plus white). Thus, HoloPaint applied the colors of the real objects to the result of virtually painting the real objects.

In other examples, in addition to affecting applications of colored paint, parameters of real materials may affect behavior of other virtual materials being applied to real objects. For instance, painting or spraying a virtual material onto a real object having a relatively high albedo may result in the material poorly sticking to the real object (e.g., at least a portion of the material may fall off the object so that the material is applied "thinly). In contrast, painting or spraying a virtual material onto a real object having a relatively low albedo (and perhaps a relatively high surface roughness) may result in the material sticking well to the real object (e.g., the material may be applied thickly). In other words, a measure of one or more parameters of a real object may be used to affect the behavior of what is virtually being applied to the real object. Paint on different portions of a real object may behave differently, depending on surface characteristics or parameters of the different portions (e.g., one portion may be shiny so that paint or other virtually applied substance may not stick to the portion, whereas another portion may be porous or rough and paint may stick to that portion).

In some examples, HoloPaint may correlate current measurements (e.g., parameters such as those mentioned above) of the real world with past measurements. For example, HoloPaint may compare a current color or temperature of a real apple with the color or temperature of the apple measured a day earlier. In another example, HoloPaint may compare details of a portion of a real bookshelf (having books thereon) with details of the same portion of the bookshelf at an earlier time (e.g., HoloPaint may perform such comparison using image analysis of archived images, etc.). In this latter case, such comparison may reveal that a book was added or removed. Such comparison may be initiated by a painting action performed by a user. For example, the user may virtually spray paint the bookshelf. Instead of the virtual "paint" coloring the bookshelf, HoloPaint may only display the "paint" where differences between the present and the past exist. Thus, a newly added book on the bookshelf may be colored while other painted portions remain unaffected (uncolored or are not colored the same, etc.). Of course, HoloPaint may invert this process so that the newly added book on the bookshelf may not be colored while other painted portions are colored. On the other hand, a book recently removed from the bookshelf may result in a void that may be colored while other painted portions remain unaffected (uncolored or are not colored the same, etc.).

In other examples, HoloPaint may be used in warehouse settings for inventory management. HoloPaint may compare physical placement of current inventory items (e.g., placement, quantity, etc.) with the physical placement of the inventory items at an earlier time (e.g., HoloPaint may perform such comparison using image analysis of archived images, etc. Such images may be generated periodically or from time to time.). A user may virtually spray paint a group or area of inventory items. Instead of the virtual "paint" coloring the group or area of inventory items, HoloPaint may only display the "paint" where differences between the present and the past exist. Thus, any changes may be colored while other painted portions remain unaffected (uncolored or are not colored the same, etc.). An advantage of making such comparisons for virtually spray painted portions of a large area (e.g., a warehouse) is that computational loads are relatively small for performing present/past comparisons of painted areas (e.g., as needed by a user), whereas performing present/past comparisons of an entire warehouse would have a relatively large computational load.

In other examples, HoloPaint may compare colors, sounds, temperature, magnetic field, velocity, or any other parameter of a current real object with the same parameter of the real object at an earlier time, as discussed in detail below. HoloPaint may allow for a user to observe any differences in such comparison by displaying one type of paint for the differences and another type of paint for non-different portions of the real object, for example.

Figure 4:
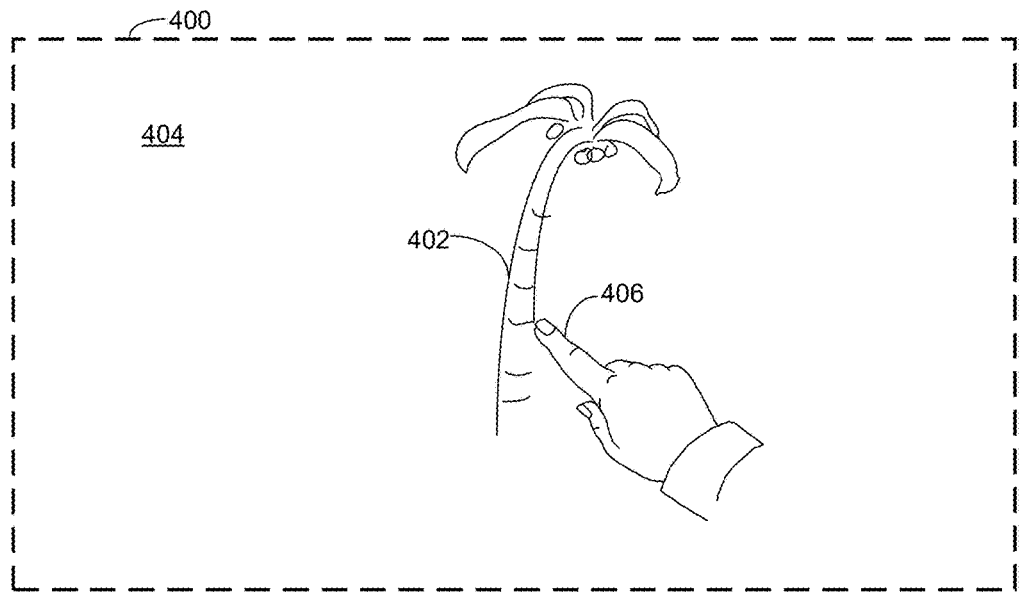
FIG. 4 is a schematic view depicting a region of a mixed reality environment that includes a drawing/painting feature, according to some examples.

FIG. 4 is a schematic view depicting a region of a mixed reality environment 400 that includes a drawing/painting feature 402, according to some examples. In this example illustration, using HoloPaint, a user is drawing on a virtual or real surface 404 by using an index finger 406 to sketch a palm tree. In some implementations, HoloPaint may incorporate machine learning to predict what a user is drawing. Such prediction may allow HoloPaint to perform a number of functions. For example, HoloPaint may finish a partially-drawn sketch. In the case illustrated in FIG. 4, as soon as the user draws enough of the sketch of the palm tree, HoloPaint may learn and predict that the user is sketching a palm tree. Consequently, HoloPaint may automatically complete the sketch without the user performing any other actions (e.g., the user need not finish the sketch). In some alternative examples, HoloPaint may automatically replace the partially-completed sketch with a full drawing of a palm tree. In some cases, HoloPaint may temporarily display several alternative sketches of a palm tree so that the user may select a preferred one. In some implementations, HoloPaint may convert a 2D sketch, such as the example palm tree, into an active and dynamic drawings (e.g., bring the drawing into an "alive" state). For example, drawing/painting feature 402 may be converted into a 3D animated object having various colors, textures, patterns, lighting, shadowing, and so on.

Figure 5:
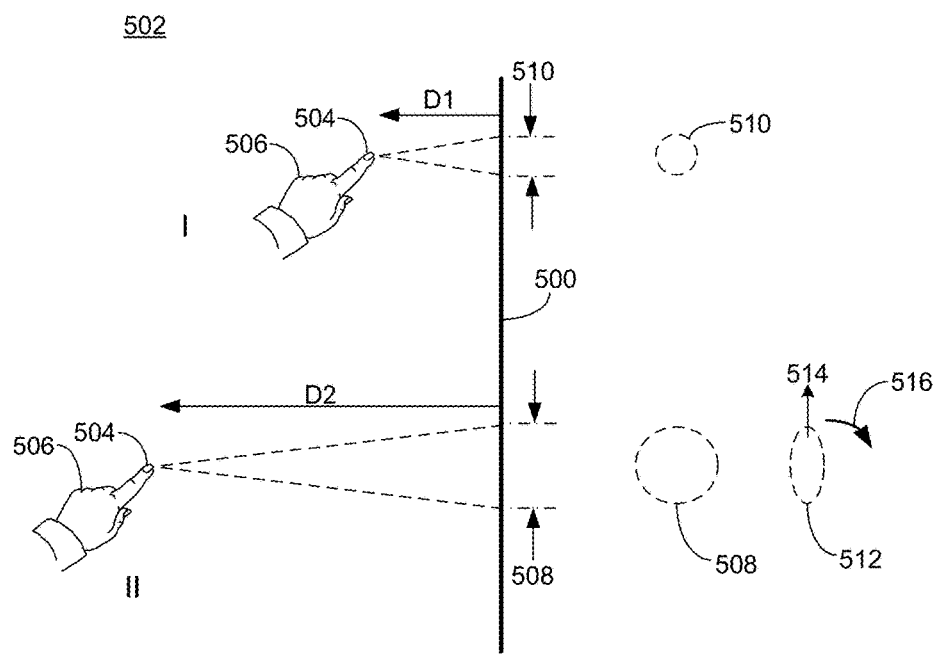
FIG. 5 is a schematic view depicting a region of a mixed reality environment involved in a process of spray painting, according to some examples.

FIG. 5 includes a schematic side view depicting of a surface 500 in a mixed reality environment 502 involved in several processes of spray painting, according to some examples. Such processes may be implemented using HoloPaint, for example. In the right portion of the figure, front views of areas sprayed onto surface 500 are illustrated. Surface 500 may be a virtual or a real surface in a mixed reality environment. Surface 500 may be flat, curved, or may have any of a number of shapes, seams, corners, and so on.

In some particular examples, to activate a spray action, a user may hold a pinch gesture, such as that used in graffiti-style painting. HoloPaint may mimic the way air brushes work. The distance between a spray can (e.g., or other tool, brush, or index finger) and surface 500 may determine the size of the sprayed paint and its proportion to the size of the spray can. A cursor to indicate where on surface 500 paint may be sprayed may follow the position of the spray can or user's hand.

In the figure, an index finger 504 of a user's hand 506 is illustrated as emitting a virtual spray of paint onto surface 500. In other examples, the user may hold a virtual spray tool (e.g., a spray can, a pointer, etc.). Claimed subject matter is not limited to any particular object used for spraying. In case I, the user's index finger 504 is a distance D1 from surface 500. In case II, the user's index finger 504 is a distance D2 from surface 500. In the case where the divergence of the spray is the same for cases I and II, a greater area 508 may be covered by spray in case II as compared to the spray area 510 of case I, which has a smaller distance. Though the area 508 is greater than the area 510, spray paint density of area 508 may be less than that of area 510. Different densities may appear as different color hues, and may depend, at least partially, on the original color of surface 500. For example, if surface 500 is white, then a greater paint density corresponds to a darker color. Spray paint density may also be determined by length of time that spray paint is emitted onto surface 500. In some examples for which paint corresponds to a physical attribute, density of the paint applied to a service may be proportional to an intensity or strength of the physical attribute. For instance, if the physical attribute is heat, then a greater density of paint (which corresponds to heat) on a surface has a greater heat value.

In some examples, HoloPaint may use spatial mapping to track the mixed reality environment to maintain color and size of paint as well as to maintain different properties associated with the paint with respect to particular positions or location in the environment. Such spatial mapping may also be used to determine distances (e.g., D1 and D2) and relative orientations of surface 500, index finger 504, and hand 506, for example.

In some examples, a user can splatter paint on different surfaces by moving a hand with velocity (e.g., speed and direction). The size of the resulting painting may be proportional to the velocity. If the user is spraying paint with a relatively high velocity, the painting may be relatively large with a relatively large amount of paint. On the other hand, if the user is spraying with subtle movements, the opacity of the resulting painting may be relatively small with a relatively small amount of paint. Real physics may be applied to the spray paint action. For example, upon spray painting ceilings, sprayed paint may fall down with gravity. Upon spray painting walls, sprayed paint may drip down with gravity. Using spatial mapping, HoloPaint may detect the angle of a painted surface with respect to gravity. Such an angle may be used to generate animation of a painting that follows the inclination angle of that surface. Similarly, the user may use any of a number of types of tools, such as a "digital gun" to spray paint. In some examples, HoloPaint may be used as a digital Paintball game, where users may fire virtual paint balls at one another.

In some examples, a user may control various features of spray onto a surface by rotating a spray tool or the user's hand. For instance, the user may hold hand 506 (or a tool) at an angle with respect to surface 500. A resulting spray area 512 may be elliptical, for example. Moreover, the user may rotate hand 506 while spraying surface 500 to control a directivity 514 of spray area 512. Arrow 516 indicated that directivity 514 may be rotated to various directions. Accordingly, various characteristics of a spray area may depend, at least in part, on orientation of hand 506 or other spray tool.

Figure 6:
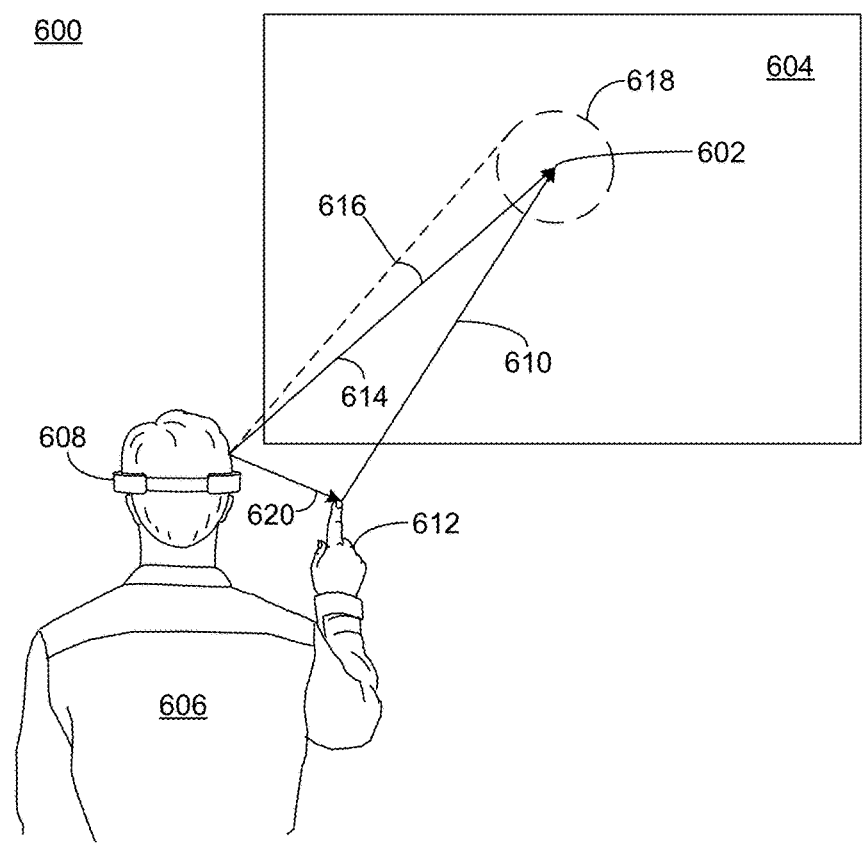
FIG. 6 is a schematic view depicting a process of determining distances in a mixed reality environment, according to some examples.

FIG. 6 is a schematic view depicting a process of determining distances in a mixed reality environment 600, according to some examples. In some cases, such a distance may be used to determine spray painting characteristics (e.g., spray paint densities, etc.). HoloPaint may infer or heuristically estimate some elements (e.g., estimate hand position relative to surface 500) of a geometry of a mixed reality environment. Any of a number of sensors may be used to provide a head mounted mixed reality display device (e.g., 200) with distance measurements in the environment. Such measurements may be used, for example, to determine an angle of a user's arm or hand with respect to a surface, etc. For instance, by knowing where a user's hand and head are in the environment, HoloPaint may infer the location and/or orientation of the user's arm. Such information may be used for spray painting operations.

In one technique, HoloPaint may consider a point 602 on a surface 604 to be a central region for a spray painted area. Point 602 may be determined based, at least in part, on a determination of which portion of surface 604 is most directly facing the eyes of a user 606 wearing a head mounted mixed reality display device 608. HoloPaint may then determine a first vector 610 from the user's hand 612 to point 602, and a second vector 614 from the user's head to point 602. In this fashion, HoloPaint may determine which part of surface 604 is closest to user 606, within a cone defined by an angle 616 of the user's gaze (e.g., which may be a predetermined angle, such as about 30 degrees, or other value). Such an angle leads to a potential spray area 618, for example. HoloPaint may calculate a displacement vector 620 from vectors 610 and 616. Displacement vector 620 may provide an offset distance from gaze to the location of hand 612. Because, in this example, hand 612 is used for spray painting (e.g., hand 612 is the source of virtual spray paint that is sprayed onto surface 604), gaze of the user need not determine an angle or direction of spray painting. Thus, displacement vector 620 may allow HoloPaint to decouple spray paint direction from gaze of the user.

Figure 7:
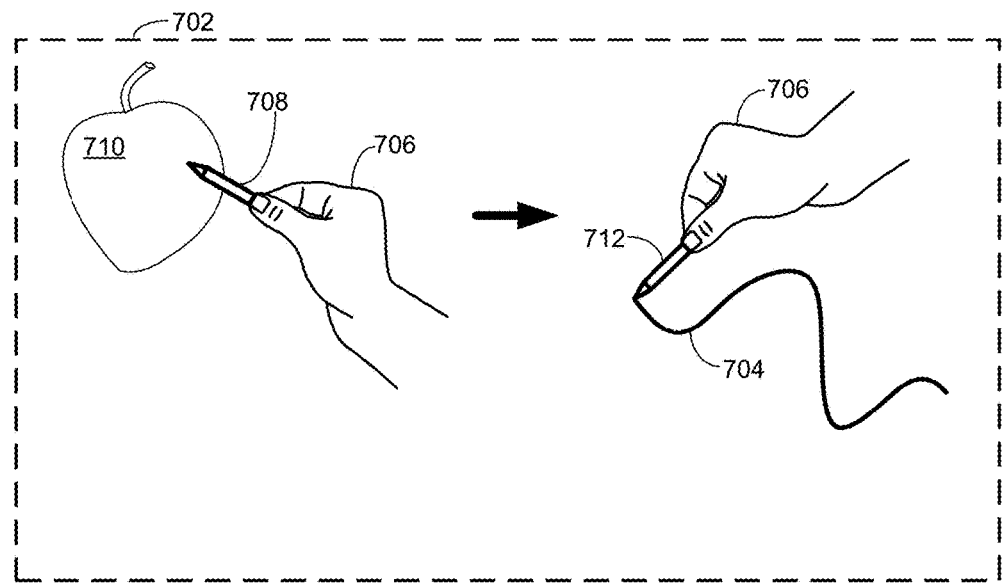
FIG. 7 is a schematic view depicting a process of adapting a property in a mixed reality environment and applying the property to a drawing/painting, according to some examples.

FIG. 7 is a schematic view depicting a process of adapting a property in a mixed reality environment 702 and applying the property to a drawing/painting 704, according to some examples. In various implementations. HoloPaint may use an internal RGB camera and depth sensors of a head mounted mixed reality display device (e.g., HOLOLENS®) to approximate properties of a material of the selected surface in mixed reality environment 702. A user may select any of a number of parameters, such as colors, textures/images, surface contours, and so on, from the environment and apply the parameters to drawing or painting actions via brushes, fingers, or other tools.

In FIG. 7, a hand 706 of the user may hold a peripheral device (real or virtual) 708 that can point to an object 710 (real or virtual) and select one or more parameters of the object (or particular portion thereof). In a particular example, object 710 may be a red plum. A parameter of object 710 may be a particular color red. HoloPaint can record such parameters, which may subsequently be applied, via a drawing or painting tool 712, to drawing/painting 704. In this example, drawing/painting 704 may be colored the same red as the color of object 710.

Either for spray painting, splattering, or painting in air, characteristics of how tool 712 operate may depend, at least in part, on a live data feed. For instance, one spray paint brush may deposit a live video feed from an internet service like Periscope®. In such a fashion, the user may paint any part of environment 702 using live feeds (e.g., live volumetric feeds, or whatever may become available in real-time).

Figure 8:
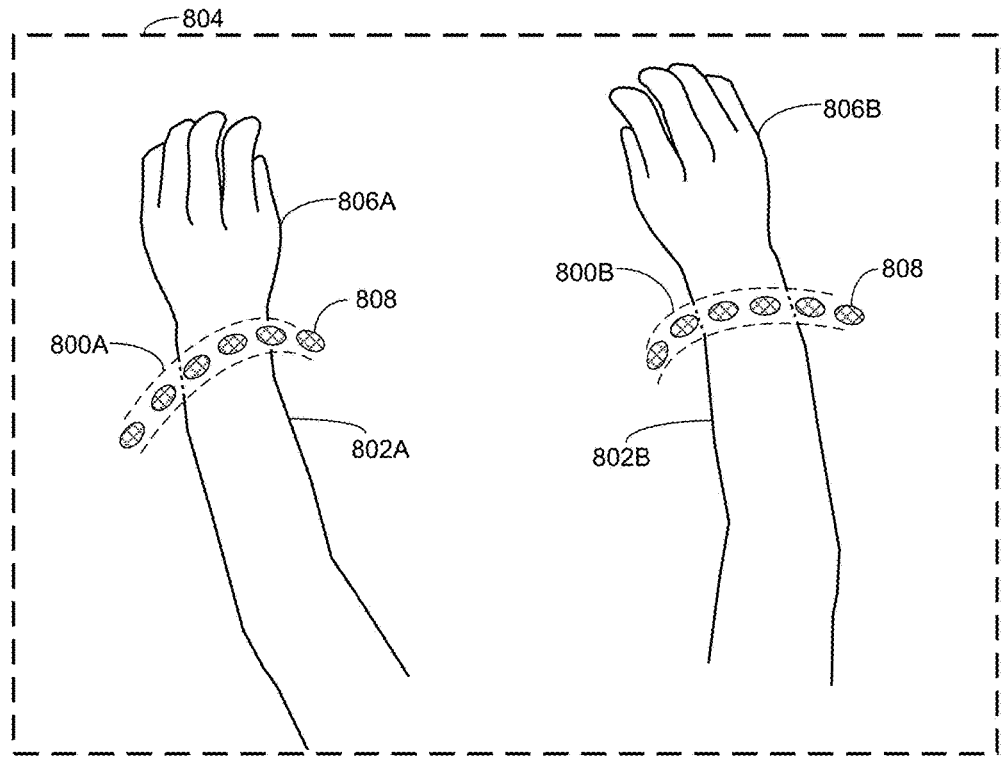
FIG. 8 is a schematic view depicting arm-lock menus on wrists of a user in a mixed reality environment, according to some examples.

FIG. 8 is a schematic view depicting arm-lock menus 800A and 800B (collectively referred to as "800") on wrists 802A and 802B (collectively referred to as "802") of a user in a mixed reality environment 804, according to some examples. HoloPaint may create menus unobtrusively in mixed reality by using human augmentation. For example, menus 800 may resemble virtual bracelets around the wrist or forearm 802 of the user. The menu selection may be designed to take advantage of a relatively narrow field of view provided by Hololens, for example. Such arm-lock menus in the form of bracelets tend to be unobtrusive so that, while drawing for example, the user need not be bothered by the menus, which are in a peripheral view of the user. Therefore, if the user is focused on the index finger position of the user's hand 806A and 806B (collectively referred to as "806"), the user need not be distracted by the menu bracelet. Nevertheless, the user still has the advantage of looking slightly downward to have full view of the arm-lock menus.

In some examples, the arm-lock menus may be used by voice commands so that the user's hands need not be disturbed while drawing or painting. For example, if the user has an air paint option selected and the brush selected is "watercolor," while the user is already drawing, the user can say "light" and the brush may change to a light painting one.

The approximate positions of the arm-lock menus (e.g., bracelet) may be estimated from respective locations of the center of the hands 806. In some examples, menus 800 may constantly face (e.g., "billboard") the camera of the user's headset. Such "billboarding" may be used to provide menu items 808 of menus 800 with 2D textures that can appear to have depth or can appear as a 3D illusion because of the generally circular shape of menus 800. In some particular examples, menu items 808 may appear to be orbiting (spinning) on menus 800 around wrists 802. Such an effect may be aesthetic and need not provide any particular function. In any case, such orbiting may cease upon or after an indication that the user desires to use the menus, such as by moving one hand near one of the menus, or by a voice command.

Menu items 808 may include buttons, dials, slide bars, etc. Menu items 808 may be used for any of a number of drawing/painting functions or other functions associated with operating in environment 804. Selection of control of a menu item on menu 800A, for example, may be performed by using a finger of hand 806B for tapping, sliding, etc. In one example, after a menu item is tapped, the menu item may expand to a larger size for greater visual resolution. This may be useful for selecting among a number of colors of a color palette, for example.

In some examples, HoloPaint may allow for two hand gesture interaction. The vector distance between the left and right hands may be used to resize 3D content such as air paintings or 3D objects. Similarly, a user may use the same type of gesture to zoom in or zoom out in a 3D scenario to get closer or far away from an object. In some examples, the distance between the user's dominant hand and the other hand may be used to determine a power to be applied to a virtual effect, such as shooting an arrow or slingshot to project or apply paint onto a surface (e.g., such as a surface of a person during a virtual paintball game).

Figure 9:
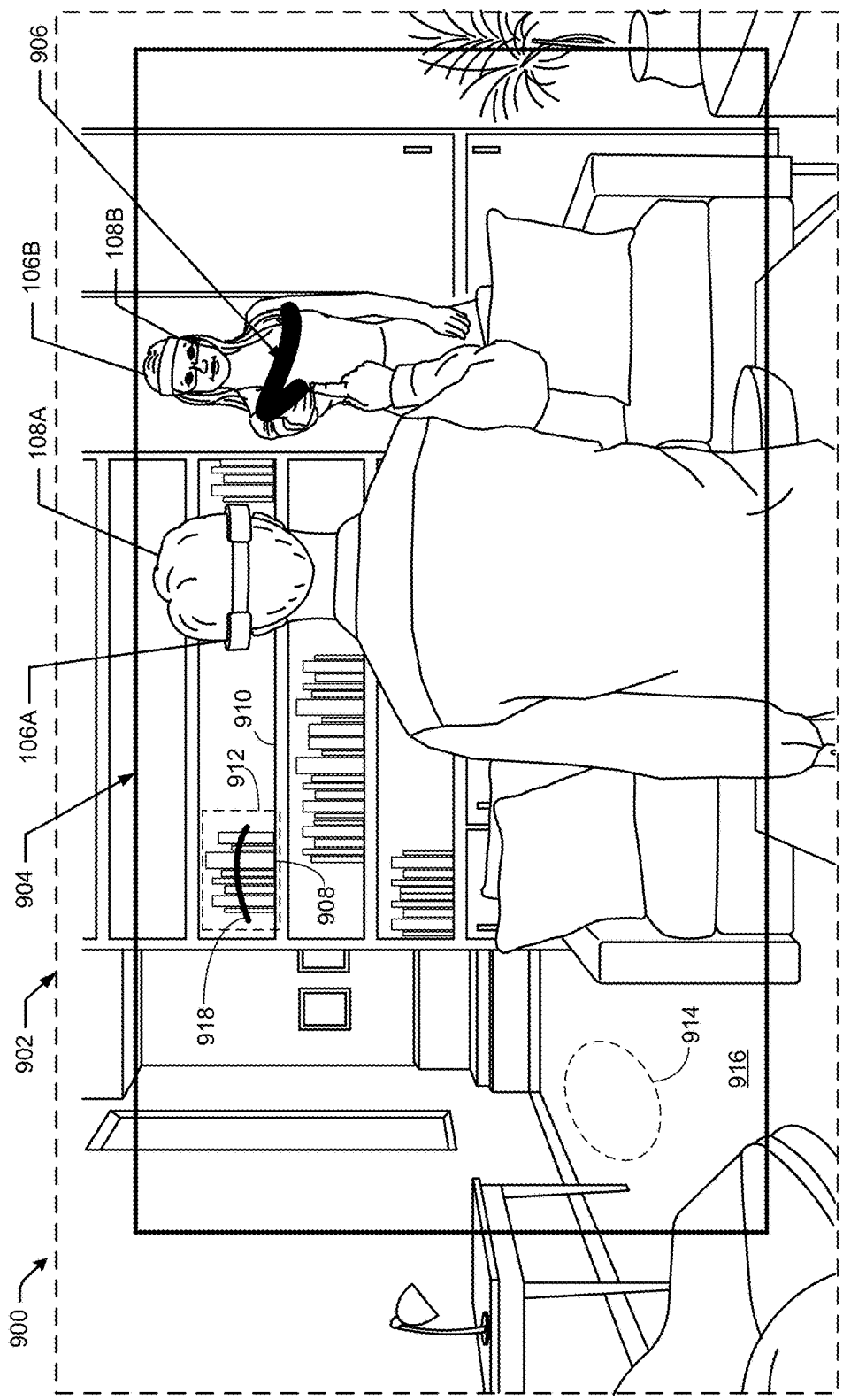
FIG. 9 is a schematic diagram showing an example of a view of a mixed reality environment wherein two or more users can interact with one another and/or with virtual content that is presented in the mixed reality environment.

FIG. 9 is a schematic diagram showing an example of a view 900 of a mixed reality environment 902 wherein two or more users can interact with one another and/or with virtual content that is presented in the mixed reality environment. HoloPaint may be used for shared experiences in the same or remote spaces, augmenting the remote's person environment or their bodies, spray painting a mural collaboratively, or air painting with multiple people, just to name a few examples. HoloPaint may allow for decorating another person's head with spray paint, for example. HoloPaint objects (e.g., persons) may be augmented with virtual objects or drawings (e.g., painting a person's face, placing horns on their head, and so on) or decorating people's whole bodies, whenever their bodies come to be measured in a mixed reality setup. HoloLens may add random digital content or funny things like the plugins GOOGLE HANGOUTS® to overlay content on top of someone's faces.

The area depicted in the dashed lines in FIG. 9 corresponds to a real scene in which the first user 108A and a second user 108B are physically present. In some examples, first user 108A or second user 108B may be remotely located and can be virtually present in the mixed reality environment (e.g., as an avatar, a reconstructed 3D model that has been captured using various sensors and/or cameras (e.g., KINECT® or TOF camera)). That is, device 106A corresponding to user 108A may receive streaming data to render the remotely located user 108B in the mixed reality environment presented by the device 106A. The area depicted in the solid black line corresponds to the spatial region 904 in which the mixed reality environment is visible to user 108A via a display 204 of corresponding device 106A. As described above, in some examples, the spatial region can occupy an area that is substantially coextensive with a user's actual field of vision and in other examples, the spatial region can occupy a lesser portion of a user's actual field of vision. Additional users (e.g., user 106C, etc.) may be present but not visible in the spatial region 904.

In the example of FIG. 9, user 108A may be viewing various virtual content items in the user's mixed reality environment via a display 204 of device 106A. As described below, the user may have authenticated his device. Based at least in part on authenticating his device, the rendering module 136 associated with his device can render the various virtual content items on the display 204 corresponding to his device.

In some examples, user 108A may virtually paint on user 108B. The user may create 3D representations 906 of trails of light, texture, and colors on user 108B. In some examples, the user may draw using the tip of their index finger. In such cases, the size of the "paint brush" may be varied by adding more fingers. For example, two fingers may make the thickness of the brush bigger than for one finger, three fingers may make the thickness of the brush bigger than for two fingers, and so on.

In some examples, a masking function (e.g., selectable from an arm-lock menu) may be used to "paint" objects, including user 108B, with a virtual masking material. Subsequently, any surface or object (or portion thereof) previously painted with such masking material may not be painted or marked upon.

Spatial region 904 includes a set of books 908 on a shelf 910 in region 912. Spatial region 904 also includes a region 914 of floor 916 in the scene. In some examples, user 108A may virtually paint the set of books 908 or a portion of floor 916, such as portion 914. The user may create 3D representations 918 of trails of light, texture, and colors on the set of books 908 or floor 916. For example, 918 may be a thin or thick line, brush stroke, spray painted region, and so on. In some examples, the user may draw using the tip of their index finger. Such a 3D representation may be used as a tool to analyze characteristics, and the history of such characteristics, of objects in a scene, as described below.

Figure 10:
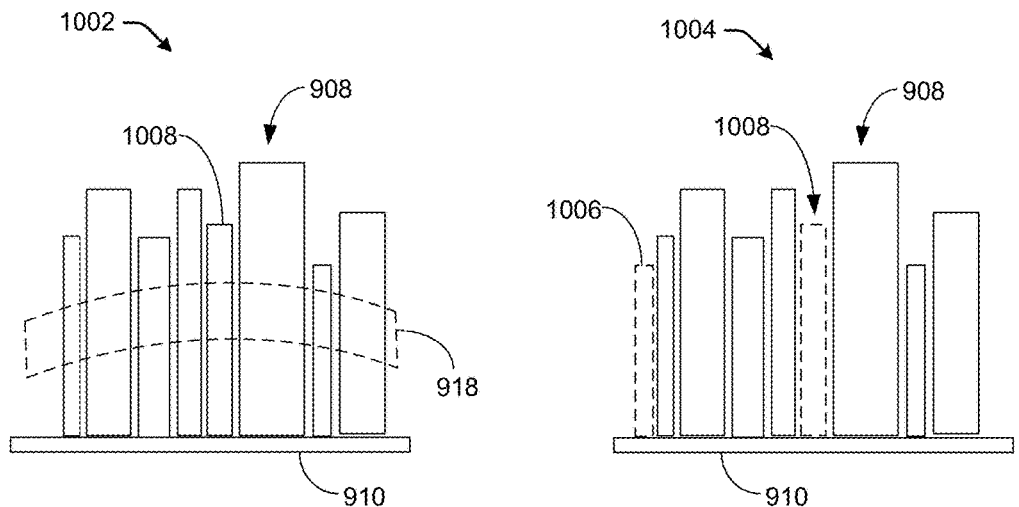
FIG. 10 illustrates a first instance of a set of books on a shelf and a second instance of the set of books on the shelf in a mixed reality environment, according to some examples.

FIG. 10 illustrates a first instance 1002 of the set of books 908 on shelf 910 and a second instance 1004 of the set of books 908 on shelf 910. Thus, for example, a comparison of instances 1002 and 1004 may be used to determine changes among the set of books 908. In other words, HoloPaint may compare details of region 912 (a portion of shelf 910 having the set of books 908 thereon) with details of the same region 912 at an earlier time (e.g., HoloPaint may perform such comparison using image analysis of archived images, etc.). Such comparison may reveal that a book 1006 was added or a book 1008 was removed in the time span between first instance 1002 and second instance 1004. A user may select a particular time as first instance 1002. Data, such as image data or other parameters or attributes, of the first instance may have been measured at the first instance and subsequently stored in memory. Generally, second instance 1004 is the present time. Such comparison may be initiated by a painting action performed by a user. For example, the user may virtually spray paint or draw a 3D representation, such as 918, which may be a line (e.g., of any thickness), across the set of books 908. Instead of the virtual "paint" coloring the books, HoloPaint may only display the "paint" where differences between the present and the past exist, as described below. In some implementations, "user" need not be human and instead may be a processor performing these processes.

Figure 11:
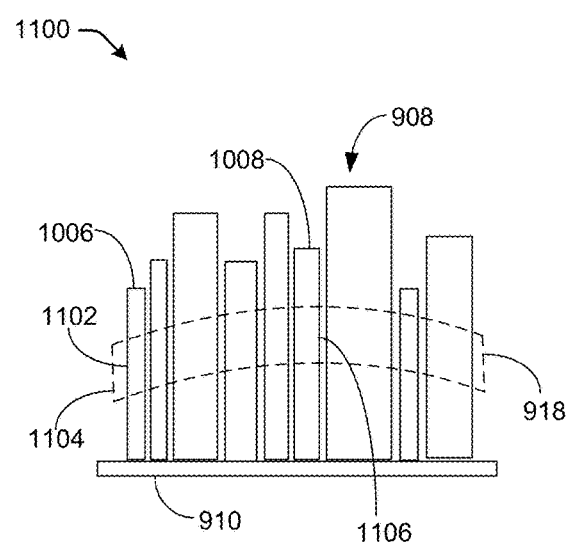
FIG. 11 illustrates displayed output that shows a comparison of a set of books at a first instance and at a second instance in a mixed reality environment, according to some examples.

FIG. 11 illustrates displayed output 1100 that shows a comparison of the set of books 908 at first instance 1002 and at second instance 1004, according to some examples. In other words, such displayed output indicates books that are added to the set of books 908 and books that are removed from the set of books 908. Thus, for example, a newly added book on shelf 910 may be colored while other painted portions remain unaffected (uncolored or are not colored the same, etc.). Of course, HoloPaint may invert this process so that the newly added book on shelf 910 may not be colored while other painted portions are colored. On the other hand, a book recently removed from the bookshelf may result in a void that may be colored while other painted portions remain unaffected (uncolored or are not colored the same, etc.).

In one implementation, subsequent to a user drawing 3D representation 918 (in second instance 1004), a color, texture, and/or shading may cover added book 1006 and may cover removed book 1008 to show changes to the set of books 908. Such color, texture, and/or shading may cover the portions of these added/removed books within the outline of 3D representation 918. Thus, for example, color, texture, and/or shading may cover portion 1102 of added book 1006 within the outline 1104 of 3D representation 918. Also, color, texture, and/or shading may cover portion 1106 of removed book 1008 within the outline 1104 of 3D representation 918. In other implementations, the opposite may be the case, where color, texture, and/or shading may cover all but portions of added or removed books within the outline 1104. Claimed subject matter is not limited in this respect.

In some examples, the user may have been most interested in the books on the shelf in region 912, and thus virtually painted only a portion of this region (e.g., by drawing 3D representation 918). By limiting the part of the shelf to be analyzed, computational effort may be relatively small, such as compared to analyzing all the books on the entire shelf.

In some implementations, a user may select which parameter or attribute to analyze by selecting a particular type of paint, such as for drawing a 3D representation (e.g., 918). For example, referring to FIG. 9, if 3D representation 918 is virtually painted with a first "color" or paint, then the parameter may be missing objects. On the other hand, if 3D representation 918 is virtually painted with a second "color" or paint, then the parameter may be added objects. By painting with yet another color, the parameter may be both added objects and missing objects, and so on. In some implementations, parameters may be combined or compounded. Thus, for example, by painting with yet another color, a combination of the parameters may be "missing books" plus "books thicker than two inches." In this example, comparing instances may be limited to detecting missing books that are thicker than two inches. Other missing books may be ignored.

Figure 12:
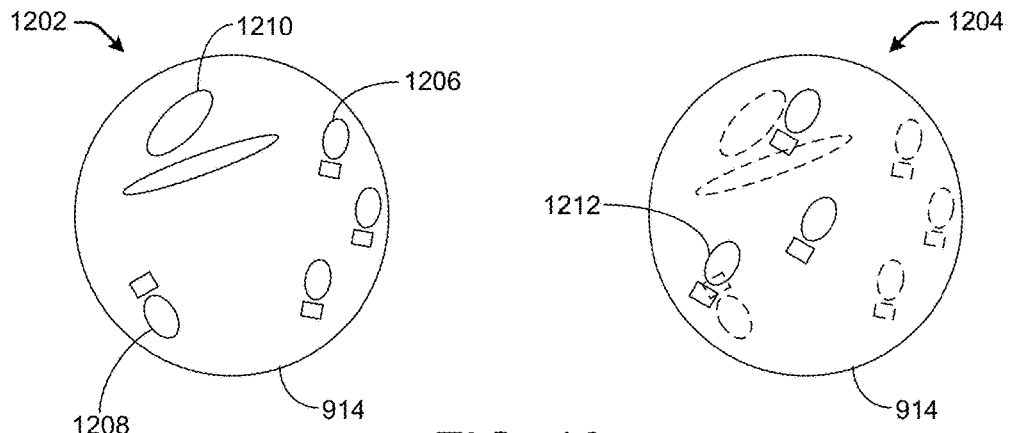
FIG. 12 illustrates a mapping or distribution of a parameter in a first instance of a region of a mixed reality environment and in a second instance, according to some examples.

FIG. 12 illustrates a mapping or distribution of a parameter in a first instance 1202 of region 914 and in a second instance 1204, according to some examples. A mapping of a parameter over an object may be useful because values of the parameter are generally different for different parts of the object. As mentioned above, user 108A may virtually paint portion of floor 916, such as portion 914 to create 3D representations, which may be performed, for example, by spraying virtual spray paint onto a region 914 of floor 916. The user may want to analyze a particular aspect of that portion of floor 916 by comparing one or more parameters at two different times. In the illustrated example, a parameter may be the texture of carpet on floor 916. The texture may be quantified as an optical property (e.g., reflectivity, hue, color, shading, etc.) of the carpet, for example. In first instance 1202, the carpet in portion 914 has various patterns 1206-1210 of differing textures. For example, pattern 1206 may be one set of footprints (e.g., which press into the carpet and change the texture), pattern 1208 may be a single footprint, and pattern 1210 may an arbitrary change of texture. In second instance 1204, the carpet in portion 914 has added texture patterns in different parts of portion 914. For example, a series of footprints 1212 have a texture that is different from other parts of portion 914 or have a texture and/or pattern that is distinguishable from patterns 1206-

1208 (illustrated as dashes in second instance 1204) that originated at or before first instance 1202. A comparison between the texture parameter in first and second instances thus indicates footprints 1212 added since the first instance. Similar comparisons may be performed for any of a number of parameters, such as fluorescence, heat, temperature, and so on.

In some examples, the user may have been most interested in portion 914 of floor 916, and thus virtually painted only portion 914. By limiting a size of portion 914, computational effort may be relatively small, such as compared to analyzing an entire scene of mixed reality.

Though the example described for FIG. 12 involves texture, a processor may perform similar processes for other parameters. For example, instead of such a process involving texture of a carpet, the process may involve radiation in a space near a nuclear power plant, gravitational constants superimposed onto mappings of the earth for geological analysis, thermal signatures of buildings to analyze effects of different building components on heat loss, velocity vectors of water flow of a river below a dam to analyze erosion for different spill rates of the dam, fluorescence mapping of a crime scene, and so on. In other words, any physical parameter may be applied to the processes described above.

In some implementations, a user may select which parameter to analyze by selecting a particular type of paint, such as for drawing a 3D representation (e.g., 918). For example, referring to FIG. 9, if region 914 is virtually painted with a first "color" or paint, then the parameter may be texture, as in the example described above. On the other hand, if region 914 is virtually painted with a second "color" or paint, then the parameter may be heat. By painting with yet another color, the parameter may be fluorescence, and so on. In some implementations, parameters may be combined or compounded. Thus, for example, by painting with yet another color, a combination of the parameters may be fluorescence plus temperature, and so on.

The processes described in FIGS. 13-15 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example processes are described in the context of the environment 100 of FIG. 1 but are not limited to that environment.

Figure 13:
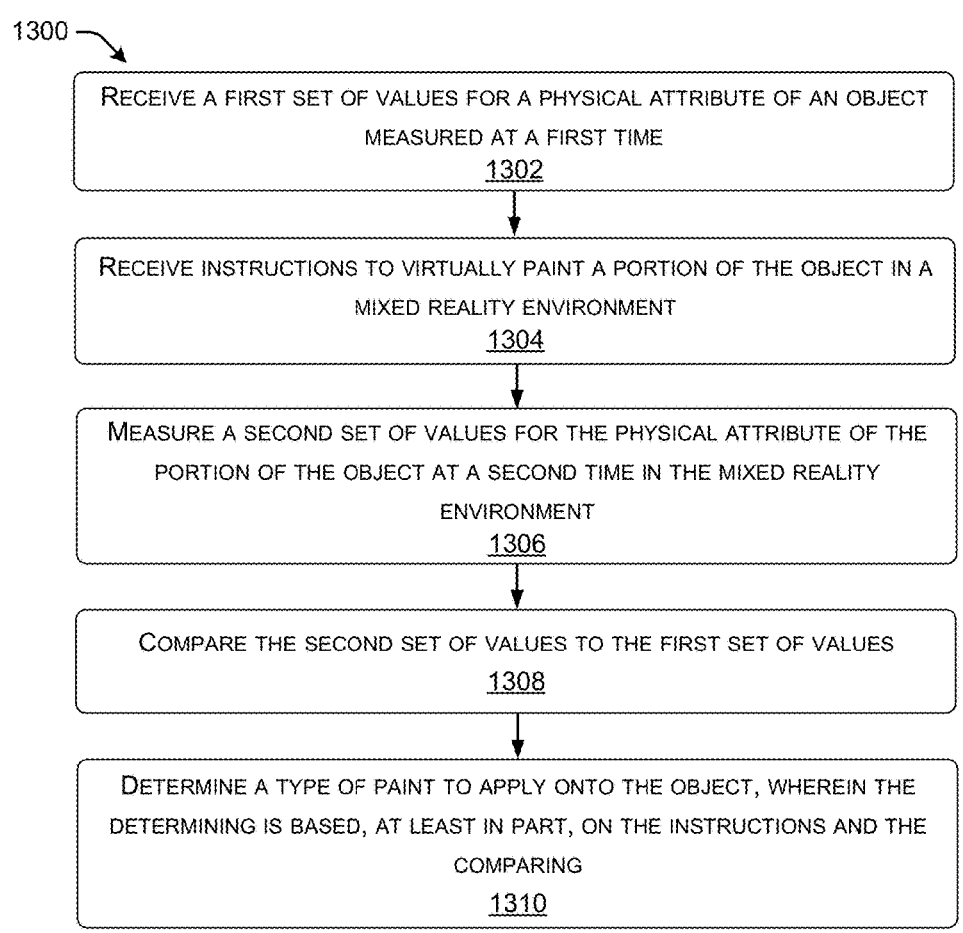
FIG. 13 is a flow diagram that illustrates an example process for applying virtual paint onto an object to display changes of a physical attribute of the object from one time to a subsequent time, as presented in a mixed reality environment.

FIG. 13 is a flow diagram that illustrates an example process 1300 for applying virtual paint onto an object to display changes of a physical attribute or parameter of the object from one time to a subsequent time, as presented in a mixed reality environment. In some examples, process 1300 may be performed by a processor, such as processor(s) 112 or processor(s) 132. At block 1302, the processor may receive a first set of values for a physical attribute of an object measured at a first time. For example, the first set of values may be provided by electronic memory, such as computer-readable media 114 and/or 134, as illustrated in FIG. 1. The object may be a virtual object or a real object. The physical attribute may be color, texture (smoothness, roughness, porous, etc.), hue, albedo, brightness, fluorescence, transmissivity, reflectivity, size, volume, relative height, sound intensity or frequency, heat, temperature, magnetic field, electric field, gravitational field, radioactivity, resonance fields, kinematic (e.g., velocity, acceleration, rotation, etc.) vectors and/or magnitudes, just to name a few examples.

At block 1304, the processor may receive instructions to virtually paint a portion of the object in the mixed reality environment. The type of paint may any of a number of paints having color, brightness, albedo, or hue, for example. At block 1306, the processor may determine or measure, using any of a number of types of sensors or detectors, for example, a second set of values for the physical attribute of the portion of the object at a second time in the mixed reality environment. In other words, the portion to be measured is set forth by the instructions received in block 1304. For example, a user may want to have the physical attribute of a particular portion of an object measured. The user may therefore virtually paint that particular portion of the object.

At block 1308, the processor may compare the second set of values to the first set of values. In some situations, the first set of values and the second set of values for the physical attribute comprise respective mappings of the physical parameter over at least a portion of the object. At block 1310, the processor may determine a type of paint to apply onto the object, wherein the determining is based, at least in part, on the instructions and the comparing. The processor may also determine a placement location of the paint, wherein the determining is based, at least in part, on the instructions. By applying the virtual paint onto the object in this fashion, changes of a physical attribute or parameter of the object from one time to a subsequent time may be displayed in a mixed reality environment.

Figure 14:
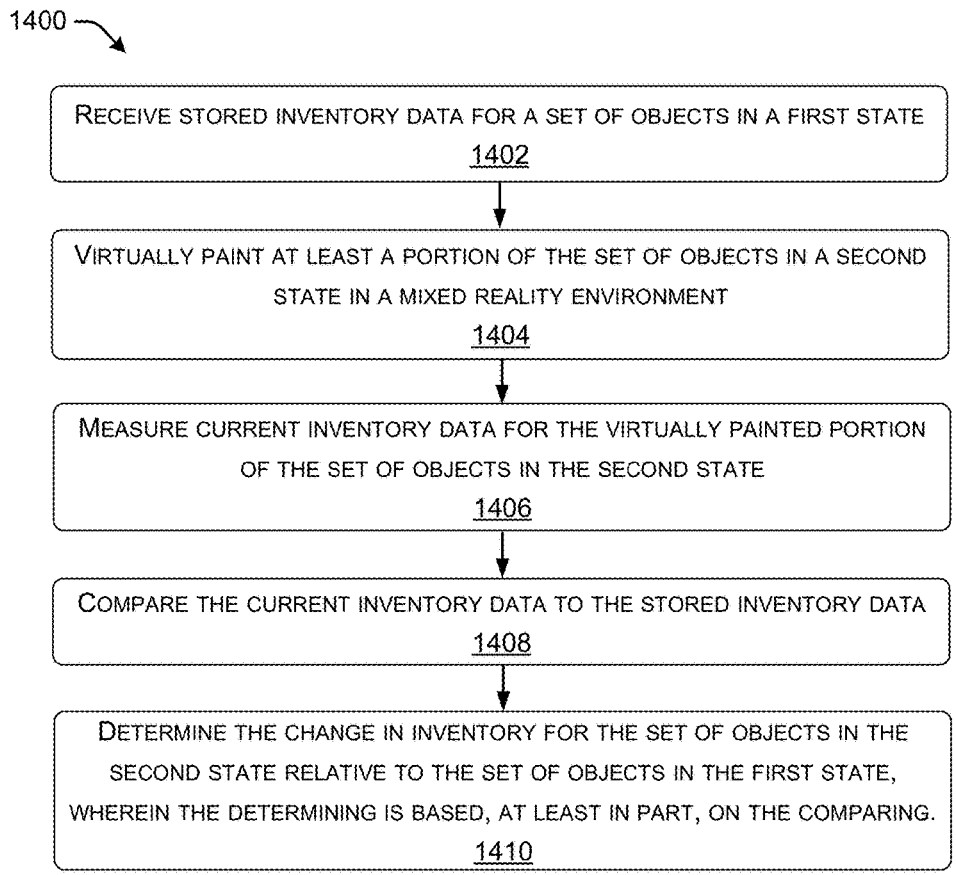
FIG. 14 is a flow diagram that illustrates an example process for managing inventory in a mixed reality environment.

FIG. 14 is a flow diagram that illustrates an example process 1400 for managing inventory in a mixed reality environment. For example, process 1400 may be used for determining if a set of books on a shelf have been altered (e.g., books added and/or books removed, sequential positioning of the books altered, and so on) during a time span. In some examples, process 1400 may be performed by a processor, such as processor(s) 112 or processor(s) 132. At block 1402, the processor may receive stored inventory data for a set of objects in a first state. The objects may be virtual objects or real objects. At block 1404, the processor may virtually paint at least a portion of the set of objects in a second state in a mixed reality environment. Generally, the set of objects in the first state comprises a first number of the objects and the set of objects in the second state comprises a second number of the objects. The second number may be different from the first number. In such a case, one or more of the objects may be added or removed during a time span from the first state to the second state.

At block 1406, the processor may measure current inventory data for the virtually painted portion of the set of objects in the second state. In some examples, the stored inventory data and the current inventory comprise a location and number of individual objects of the set of objects in the first state and the second state, respectively. In some examples, the stored inventory data comprises an image captured at a time when the set of objects is in the first state.

At block 1408, the processor may compare the current inventory data to the stored inventory data. At block 1410, the processor may determine the change in inventory for the set of objects in the second state relative to the set of objects in the first state. The determining may be based, at least in part, on the comparing. In some examples, virtually painting at least a portion of the set of objects in the second state comprises drawing a virtual line across the at least the portion of the set of objects in the second state. A user, for example, may draw such a line. In some examples, the processor may further apply virtual paint to portions of the set of objects in the second state that are different from corresponding portions of the set of objects in the first state to distinguish from portions of the set of objects in the second state that are the same as corresponding portions of the set of objects in the first state. On the other hand, the processor may instead apply virtual paint to portions of the set of objects in the second state that are the same as corresponding portions of the set of objects in the first state to distinguish from portions of the set of objects in the second state that are different from corresponding portions of the set of objects in the first state.

Figure 15:
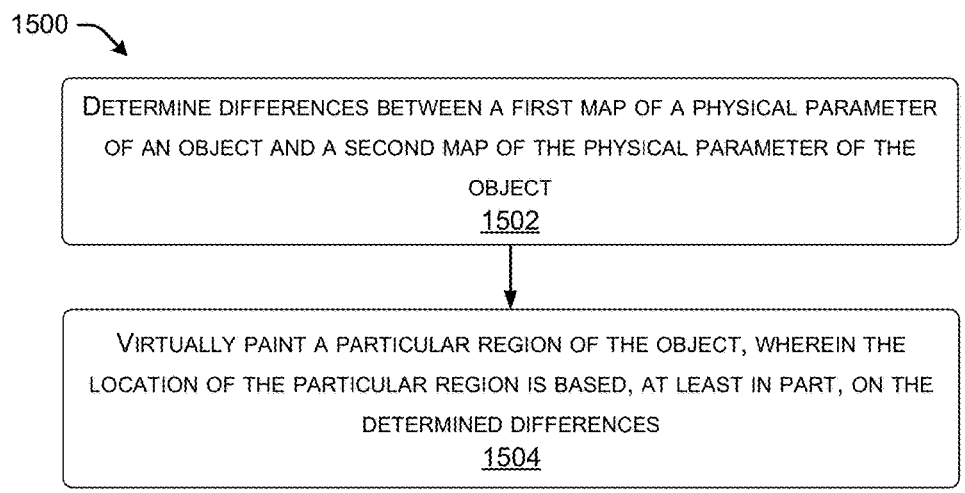
FIG. 15 is a flow diagram that illustrates an example process for applying virtual paint onto an object to display changes of a physical parameter of the object from one time to a subsequent time, as presented in a mixed reality environment.

FIG. 15 is a flow diagram that illustrates an example process 1500 for applying virtual paint onto an object to display changes of a physical parameter of the object from one time to a subsequent time, as presented in a mixed reality environment. In some examples, process 1500 may be performed by a processor, such as processor(s) 112 or processor(s) 132. At block 1502, the processor may determine differences between a first map of a physical parameter of an object and a second map of the physical parameter, which may be a kinematic or other attribute, of the object. At block 1504, the processor may virtually paint a particular region of the object. The location of the particular region may be based, at least in part, on the determined differences. In some examples, the first map of the physical parameter of the object comprises values of the physical parameter at a first time and the second map of the physical parameter of the object comprises values of the physical parameter at a second time. In some examples, the physical attribute is a compound physical attribute comprising two or more parameters of the object. Thus, as in an example described above regarding inventory of books, a combination of physical attributes may be "missing books" plus "books thicker than two inches."

Device/Server: Example Architecture and Processes

Figure 16:
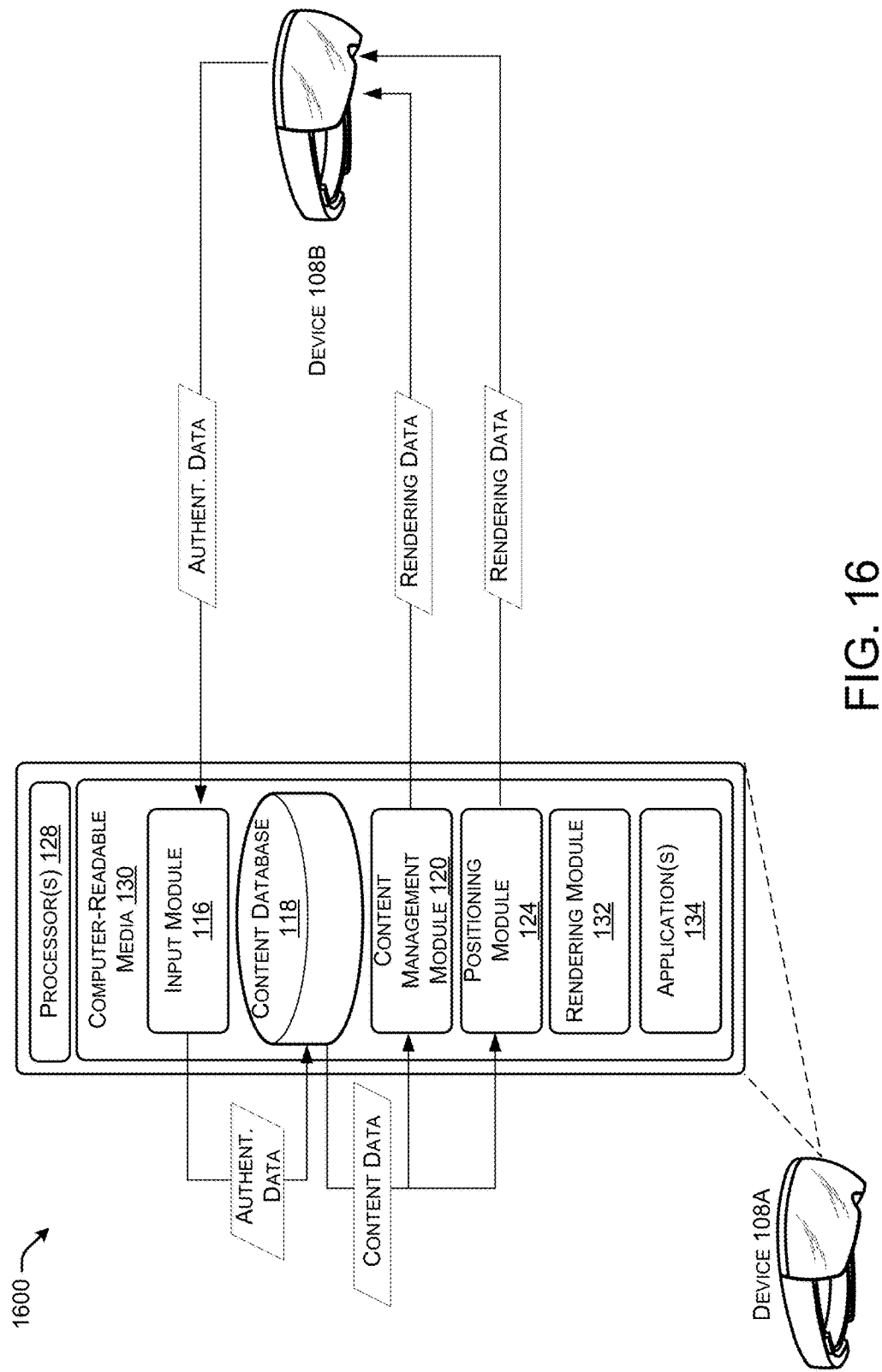
FIG. 16 is a schematic diagram showing an example environment for enabling two or more users in a mixed reality environment to interact with one another and/or with virtual content that is presented in the mixed reality environment.

FIG. 16 is a schematic diagram showing an example environment 2200 for enabling two or more users (e.g., user 106A, user 106B, and/or user 106C) in a mixed reality environment to interact with one another and/or with virtual content that is presented in the mixed reality environment. In the example illustrated in FIG. 16, a first device (e.g., device 108A) is assigned a server role and is responsible for synchronizing communications and/or virtual content rendering among all of the devices (e.g., device 108A, device 108B, and/or device 108C). In at least one example, devices (e.g., device 108B and/or device 108C) can run an application 138 locally and connect to the serving device (e.g., device 108A). In FIG. 16, the input module 116, content database 118, content management module 120, and positioning module 124 can be associated with computer-readable media 134 instead of, or in addition to, computer-readable media 114 associated with the service provider 102.

FIG. 16 illustrates a second device (e.g., device 108B) sending authentication data to the first device (e.g., device 108A). The authentication data can correspond to a user identification and password associated with the second user (e.g., user 106B), biometric identification associated with the second user (e.g., user 106B), etc. The authentication data can be utilized to determine a presence of the second device (e.g., device 108B), visual content items that are available to the second user (e.g., user 106B), and the second user's (e.g., user 106B) permissions corresponding to whether the second user (e.g., user 106B) can view and/or interact with individual ones of the virtual content items, as described above.

Based at least in part on receiving the authentication data, the content management module 120 and/or the frame rendering module 122 can access content data from the content database 118. As described above, data associated with the individual virtual content items can be stored in the content database 118. The content data may identify an owner of a virtual content item, an identification of the virtual content item, and permissions associated with the virtual content item. The content data can identify virtual content items that are owned by a profile corresponding to the second user (e.g., user 106B), virtual content items that the second user (e.g., user 106B) has open, and/or content that other users (e.g., user 106A and/or user 106C) have shared with the second user (e.g., user 106B). The content management module 120 and/or the positioning module 124 can utilize the content data to determine whether individual virtual content items can be rendered on various devices (e.g., device 108A and/or device 108C) and/or the permissions associated with each of the individual virtual content items. The content management module 120 and/or the positioning module 124 can send rendering data to the second device (e.g., device 108B) and the second device (e.g., device 108B) can render the corresponding virtual content items in the mixed reality environment associated with the second user (e.g., user 106B). As described above, the second user (e.g., user 106B) can modify the permissions (e.g., visibility, interactivity, etc.) of any of the virtual content items that he or she owns. That is, the second user (e.g., user 106B) can share the virtual content items with other users (e.g., user 106A and/or user 106C). However, the second user (e.g., user 106B) cannot modify the permissions of any of the virtual content items that he or she does not own. The second user (e.g., user 106B) can interact with individual virtual content items until the owner of each of the virtual content items makes a virtual content item private such that the second user (e.g., user 106B) cannot view the virtual content item.

The processes described in FIGS. 17 and 18 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example processes are described in the context of the environment 1600 of FIG. 16 but are not limited to that environment.

Figure 17:
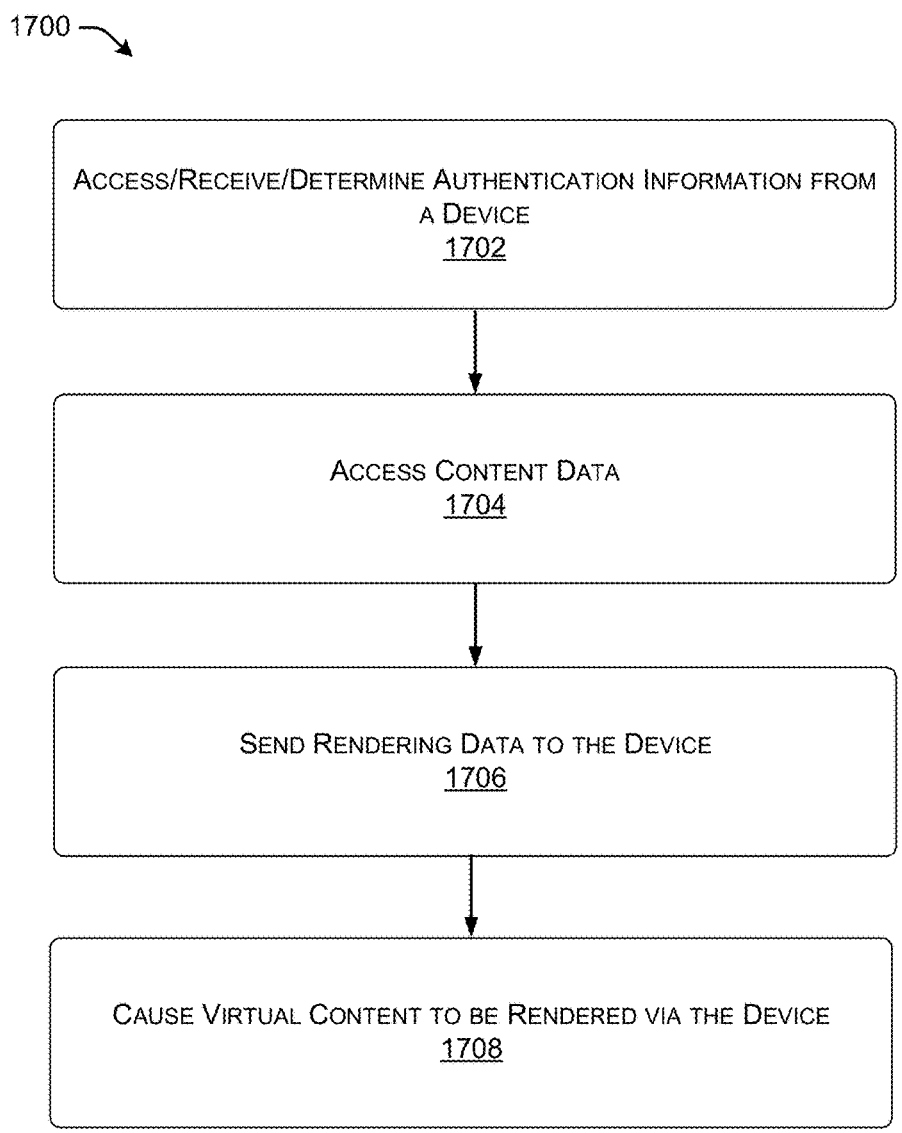
FIG. 17 is a flow diagram that illustrates an example process to cause virtual content to be presented in the mixed reality environment.

FIG. 17 is a flow diagram that illustrates an example process 1700 to cause virtual content to be presented in the mixed reality environment.

Block 1702 illustrates accessing, receiving, and/or determining authentication information from a device (e.g., device 108B). As illustrated in FIG. 16, a second device (e.g., device 108B) can send authentication data to a first device (e.g., device 108A) that can be designated as a server. The authentication data can correspond to a user identification and password associated with the second user (e.g., user 106B), biometric identification associated with the second user (e.g., user 106B), etc. The authentication data can be utilized to determine a presence of the second device (e.g., device 108B), visual content items that are available to the second user (e.g., user 106B), and the second user's (e.g., user 106B) permissions corresponding to whether the second user (e.g., user 106B) can view and/or interact with the virtual content items, as described above.

Block 1704 illustrates accessing content data. Based at least in part on receiving the authentication data, content management module 120 and/or positioning module 124 can access content data from the content database 118. As described above, the content database 118 can include content data indicating an owner identification, a content identification, and permissions associated with the individual virtual content items. The content data can identify virtual content items that are owned by a profile corresponding to the second user (e.g., user 106B) and/or content that other users (e.g., user 106A and/or user 106C) have shared with the second user (e.g., user 106B).

Block 1706 illustrates sending rendering data to the device (e.g., device 108B). The content management module 120 and/or positioning module 124 can send the rendering data to the second device (e.g., device 108B). As described above, rendering data may include instructions for rendering a graphical representation of a virtual content item via a display of a device (e.g., device 108A). For instance, the rendering data may include instructions describing the geometry, viewpoint, texture, lighting, shading, etc. associated with a virtual content item.

Block 1708 illustrates causing virtual content to be rendered via the device (e.g., device 108B). The second device (e.g., device 108B) can leverage the rendering data to render virtual content items in the mixed reality environment associated with the second user (e.g., user 106B) via the rendering module 136 associated with the second device (e.g., device 108B). As described above, the second user (e.g., user 106B) can modify the permissions (e.g., visibility, interactivity, etc.) of any of the virtual content items that he or she owns. That is, the second user (e.g., user 106B) can determine who he or she desires to share the virtual content items with and/or permissions the other users (e.g., user 106A and/or user 106C) have with respect to interacting with the virtual content items. However, the second user (e.g., user 106B) cannot modify the permissions of any of the virtual content items that he or she does not own. The second user (e.g., user 106B) can interact with individual virtual content items until the owner of each of the virtual content items makes a virtual content item private such that the second user (e.g., user 106B) cannot view the virtual content item.

Figure 18:
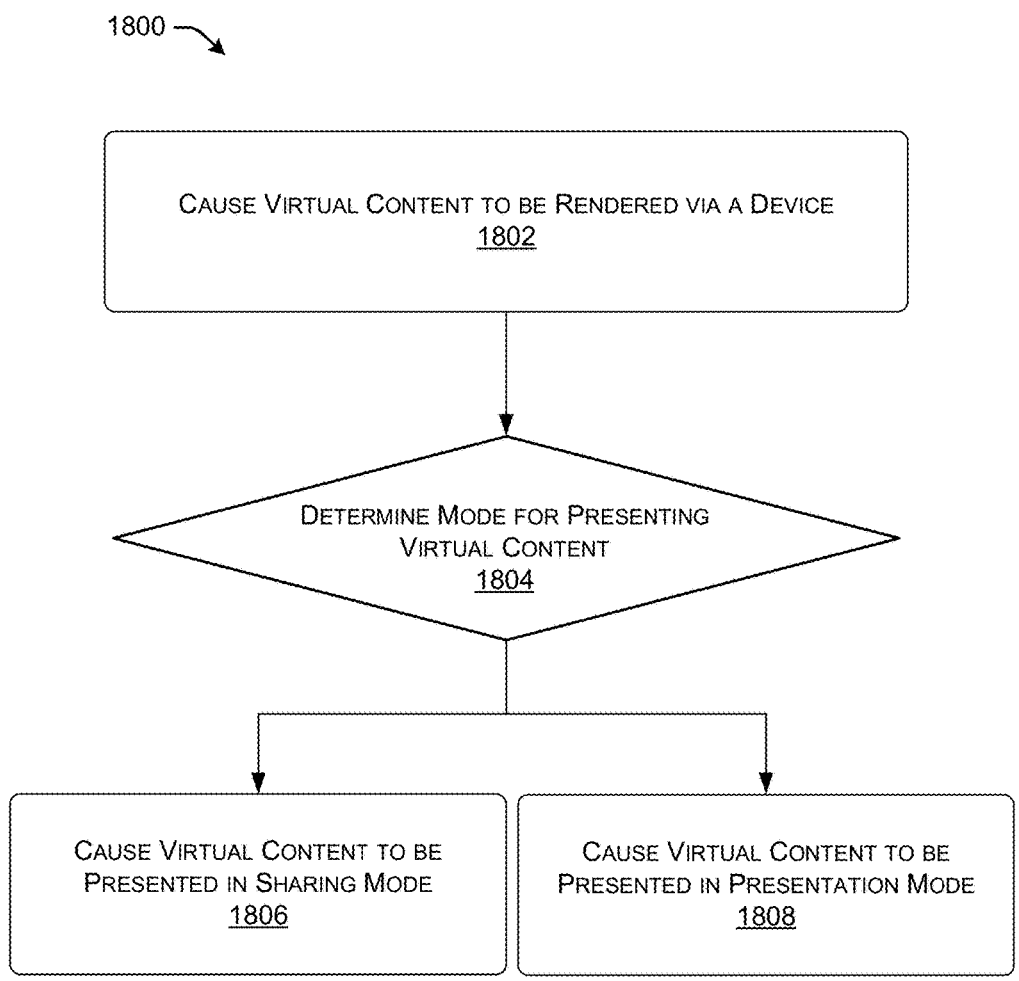
FIG. 18 is a flow diagram that illustrates an example process to cause virtual content to be presented in the mixed reality environment in different modes (e.g., presenter mode or sharing mode).

FIG. 18 is a flow diagram that illustrates an example process 1800 to cause virtual content to be presented in the mixed reality environment in different modes (e.g., presenter mode or sharing mode).

Block 1802 illustrates causing virtual content to be rendered via a device (e.g., device 108A, device 108B, and/or device 108C). As described above, the rendering module 136 associated with the device (e.g., device 108A, device 108B, and/or device 108C) can render virtual content items corresponding to the rendering data in the mixed reality environment associated with the user (e.g., user 106A, user 106B, and/or user 106C).

Block 1804 illustrates determining a mode for presenting the virtual content. In some examples, the content management module 120 can determine whether a user (e.g., user 106A) desires to present the virtual content in a sharing mode, whereby other users (e.g., user 106B and/or user 106C) can view virtual content items that the user (e.g., user 106A) shared with them via an enhanced user interface such that the virtual content items augment the real scene where the other users (e.g., user 106B and/or user 106C) are physically located within the spatial region, or a presentation mode. The presentation mode can enable the user (e.g., user 106A) to share all of the virtual content that the user (e.g., user 106A) has open (i.e., is visible on the user's (e.g., user 106A) display 204) with the other users (e.g., user 106B and/or user 106C). In such an example, the user (e.g., user 106A) can share menus, wands, virtual content items, etc. That is, the presentation mode can enable the user (e.g., user 106A) to share all of the content he or she has open with all of the other users (e.g., user 106B and/or user 106C) (i.e., make all virtual content items public) and share menus that the user (e.g., user 106A) generally can see in his or her first person view.

Block 1806 illustrates causing the virtual content to be presented in sharing mode. As described above, the owner of a virtual content item can determine who he or she wants to share the virtual content item with. In at least one example, the owner of the virtual content item can interact with a virtual menu presented to the user (e.g., user 106B) in the mixed reality environment. As described above, the virtual menu can include graphical representations of sharing settings, such as, but not limited to, private, public, etc. The virtual menu can be a drop down menu, a radial menu, etc. The virtual menu can provide the user (e.g., user 106B) with controls for indicating whether the user (e.g., user 106B) desires to make the virtual content item private or public, as described above. If the user (e.g., user 106B) desires to keep the virtual content item private, no other users (e.g., user 106A and/or user 106C) can see the virtual content item. If the user (e.g., user 106B) desires to make the virtual content item public, all of the other users (e.g., user 106A and/or user 106C) can see the virtual content item. In some examples, the user (e.g., user 106B) can specify one or more users (i.e., less than all users) with whom he or she desires to share the virtual content item. This permissions data can be provided to the content database 118 for storing with the content data. Accordingly, based at least in part on accessing, receiving, and/or determining authentication data, the content management module 120 and/or the positioning module 124 can access content data including permissions data indicating which users 106 have permission to view and/or interact with individual content data items. The other devices (e.g., device 108A and/or device 108C) can render virtual content items based at least in part on receiving rendering data from the content management module 120 and/or the positioning module 124. The other users (e.g., user 106A and/or user 106C) can view the rendered virtual content items in their own first person perspective.

Block 1808 illustrates causing the virtual content to be presented in presentation mode. In other examples, the content management module 120 can determine that a user (e.g., user 106B) desires to share his or her mixed reality environment with other users (e.g., user 106A and/or user 106C) in a presenter mode. Accordingly, the content management module 120 and/or the positioning module 124 can send rendering data to devices associated with the other users (e.g., device 108A and/or device 108C) such that the corresponding rendering modules 136 can render virtual content consistent with the virtual content presented in the user's (e.g., user 106B) mixed reality environment. The presenter mode enables the user (e.g., user 106B) to show other users (e.g., user 106A and/or user 106C) how to use an application or give a demonstration of the system. Presenter mode is similar to various desktop sharing functionalities. The other users (e.g., user 106A and/or user 106C) can see the user's (e.g., user 106B) mixed reality environment from their own first person perspective. In at least one example, the other users (e.g., user 106A and/or user 106C) can see their private mixed reality environment in addition to the mixed reality environment of the user (e.g., user 106B).

Service Provider/Server: Example Architecture and Processes

Figure 19:
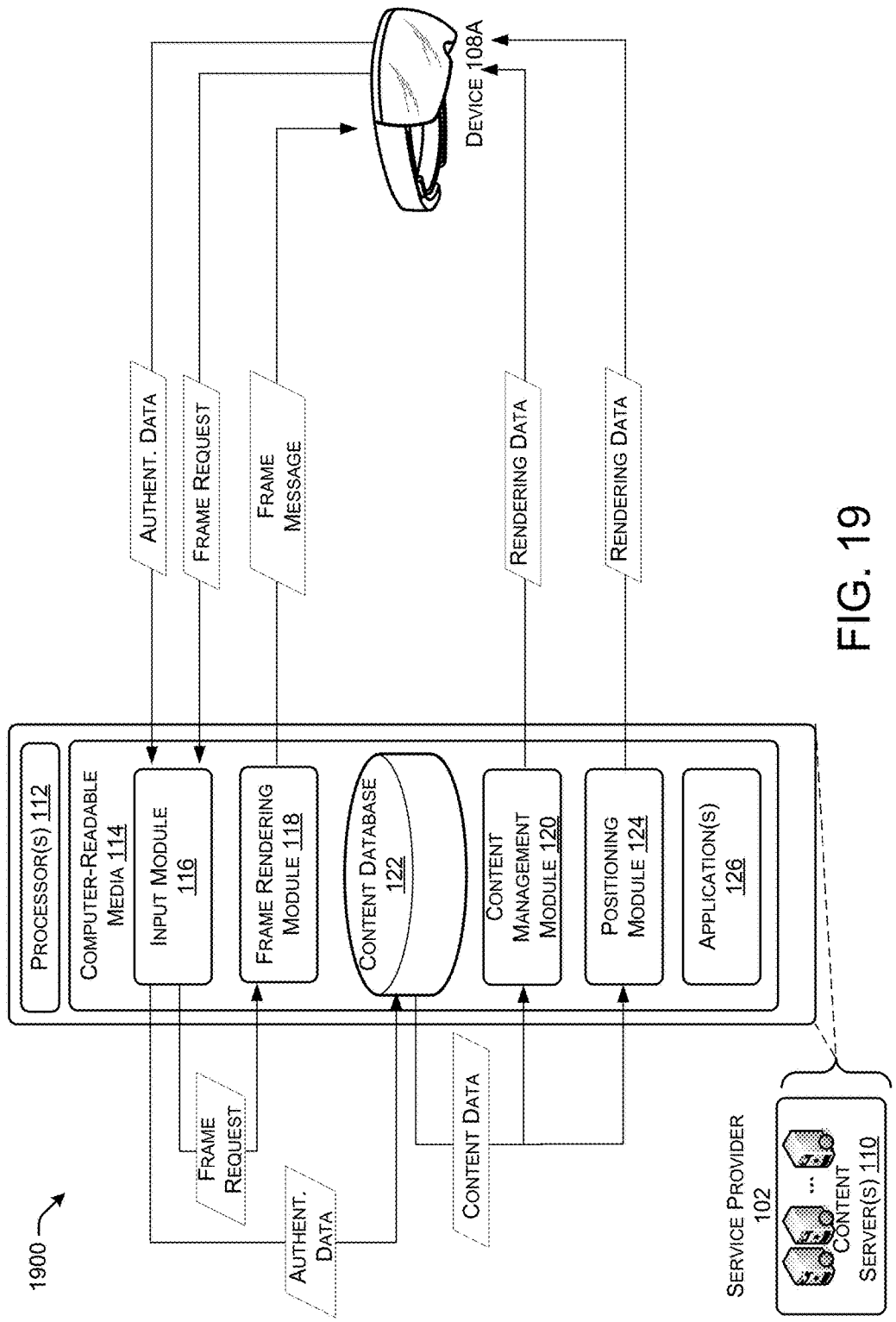
FIG. 19 is a schematic diagram showing an example environment for enabling two or more users in a mixed reality environment to interact with one another and/or with virtual content that is presented in the mixed reality environment.

FIG. 19 is a schematic diagram showing an example environment 1900 for enabling two or more users (e.g., user 106A, user 106B, and/or user 106C) in a mixed reality environment to interact with one another and/or with virtual content that is presented in the mixed reality environment. In FIG. 19, the service provider 102 serves a server role and is responsible for synchronizing communication and/or virtual content rendering by the devices (e.g., device 108A, device 108B, and/or device 108C). The devices (e.g., devices 108A, device 108B, and/or device 108C) can run an application 138 locally and receive frame messages and/or frames for presenting the virtual content.

FIG. 19 illustrates a device (e.g., device 108A) sending authentication data to the service provider 102. The authentication data can correspond to a user identification and password associated with the user (e.g., user 106A), biometric identification associated with the user (e.g., user 106A), etc. The authentication data can be utilized to determine a presence of the device (e.g., device 108A), visual content that is available to the user (e.g., user 106A), and the user's (e.g., user 106A) permissions corresponding to whether the user (e.g., user 106A) can view and/or interact with the virtual content, as described above.

Additionally, the device (e.g., device 108A) can send frame request messages in real time, as described above. The frame rendering module 122 can be configured to generate frame messages responsive to the frame requests, as described above. The frame rendering module 122 can send frame messages directly to devices 108.

Based at least in part on receiving the authentication data, the content management module 120 and/or the positioning module 124 can access content data from the content database 118. As described above, individual virtual content items can be associated with data in the content database 118 indicating an owner identification, a content identification, and permissions associated with the individual virtual content items.

Unlike the example environment 1900, in this example, the service provider 102 cannot simply send content data to the device (e.g., device 108A) and the device (e.g., device 108A) cannot simply render the virtual content in screen-space as the presentation of the virtual content can be affected by noticeable latency (e.g., movement of a user (e.g., user 106A) and/or device (e.g., device 108A) that happened before a frame is rendered on the device (e.g., device 108A)). Instead, in at least one example, the rendering module 136, stored locally on the device (e.g., device 108A), can utilize the frame messages for rendering and/or presenting the virtual content via the device (e.g., device 108A), as described above.

The process described in FIG. 20 below is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example process is described in the context of the environment 1900 of FIG. 19 but is not limited to that environment.

Figure 20:
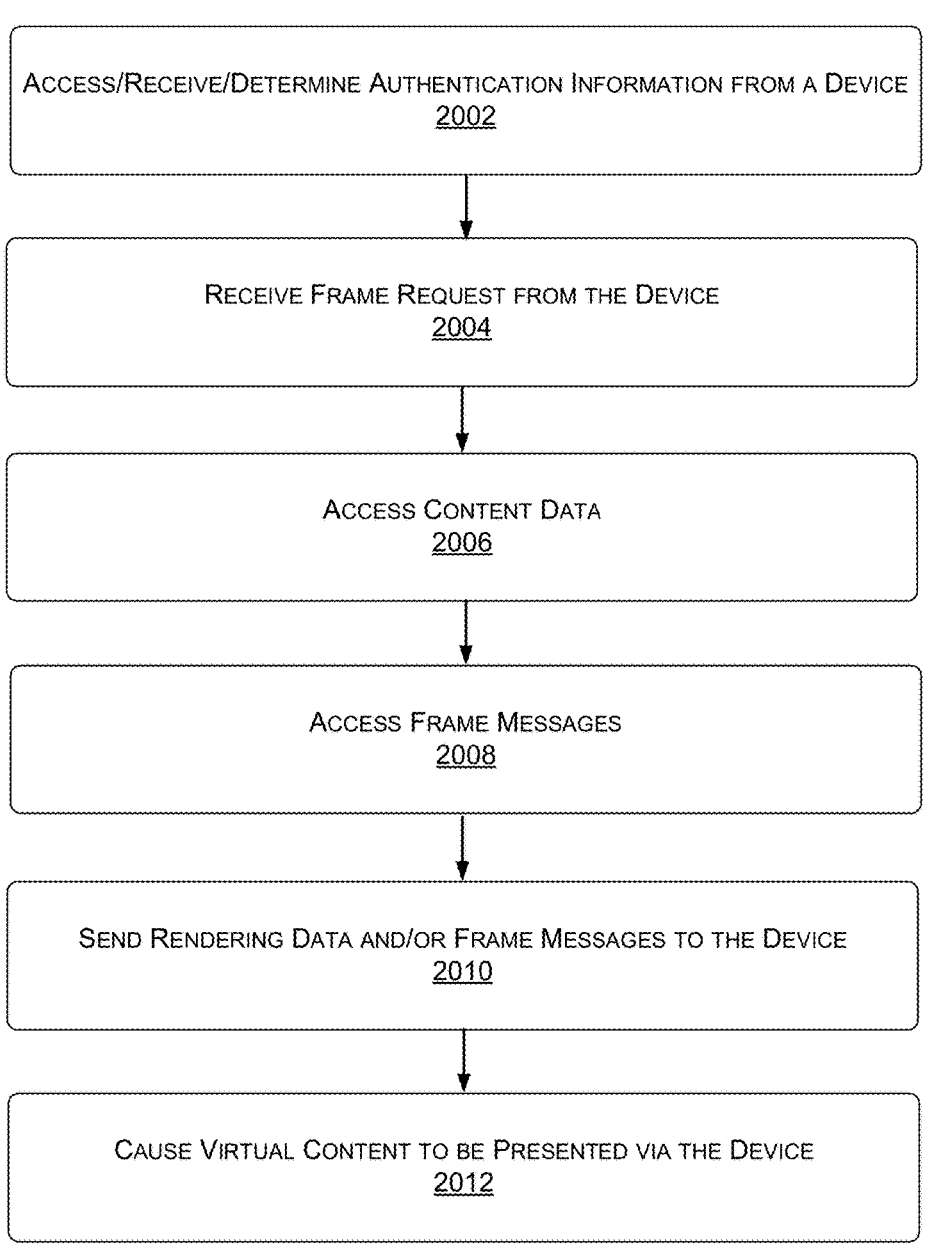
FIG. 20 is a flow diagram that illustrates an example process to cause virtual content to be presented in the mixed reality environment.

FIG. 20 is a flow diagram that illustrates an example process 2000 to cause virtual content to be presented in the mixed reality environment.

Block 2002 illustrates accessing, receiving, and/or determining authentication information from a device (e.g., device 108A). As illustrated in FIG. 16, the input module 116 can access, receive, and/or determine authentication data from a device (e.g., device 108A). The authentication data can correspond to a user identification and password associated with the user (e.g., user 106A), biometric identification associated with the user (e.g., user 106A), etc. The authentication data can be utilized to determine a presence of a device (e.g., device 108A), visual content that is available to the user (e.g., user 106A) corresponding to the device (e.g., device 108A), and the user's (e.g., user 106A) permissions corresponding to whether the user (e.g., user 106A) can view and/or interact with the virtual content, as described above.

Block 2004 illustrates receiving a frame request from the device (e.g., device 108B). The frame rendering module 122 can receive frame request messages from the device (e.g., device 108A), as described above.

Block 2006 illustrates accessing content data. Based at least in part on receiving the authentication data, the content management module 120 and/or the positioning module 124 can access content data from the content database 118. As described above, content data can be stored in the content database 118 indicating an owner identification, a content identification, and permissions associated with the individual virtual content items. Block 2008 illustrates accessing frame messages. The frame rendering module 122 can be configured to output frame messages and send the frame messages directly to devices 108, as described above.

Block 2010 illustrates sending rendering data and/or frame messages to the device (e.g., device 108A). In some examples, the rendering module 136 can receive previously rendered frames associated with frame messages from the service provider 102 to correct for potential latency and/or render correct perspectives based on the position of the user (e.g., user 106A) in worldspace. In other examples, the rendering module 136 may receive rendering data for rendering the virtual content items locally.

Block 2012 illustrates causing virtual content to be presented via the device (e.g., device 108A). The device (e.g., device 108A) can render virtual content items corresponding to rendering data in the mixed reality environment associated with the user (e.g., user 106A) via the rendering module 136 associated with the device (e.g., device 108A). As described above, in some instances, the service provider 102 may be unable to send rendering data to the device (e.g., device 108A) and the device (e.g., device 108A) may be unable to render the virtual content in screen-space as the presentation of the virtual content can be affected by noticeable latency. Instead, in at least one example, the rendering module 136, stored locally on the device (e.g., device 108A), can leverage the frame messages to cause the virtual content items to be presented via the device (e.g., device 108A), as described above.

Modifying Visibility and Interacting with Virtual Content Items

Figure 21:
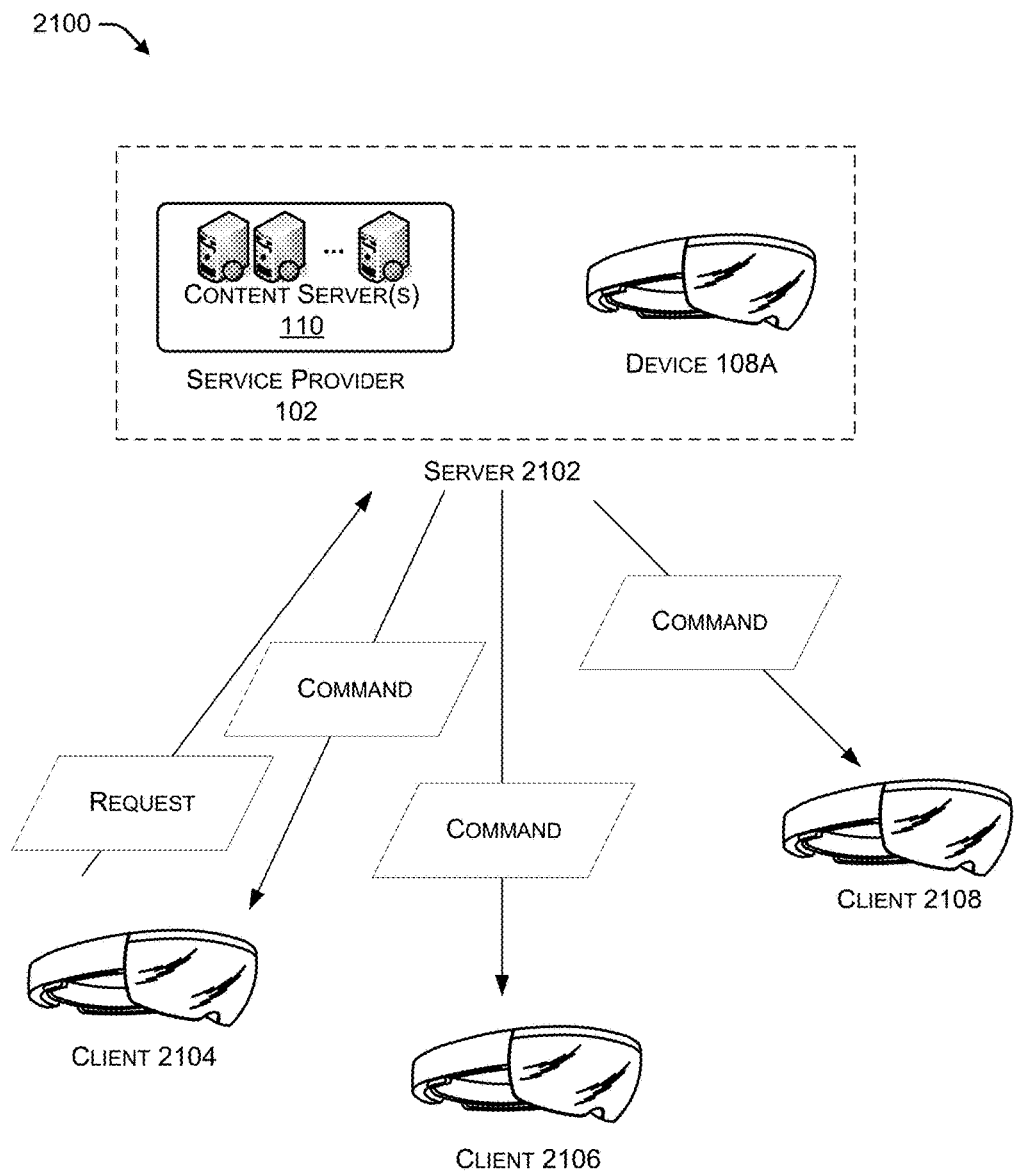
FIG. 21 is a schematic diagram showing an example environment for enabling two or more users in a mixed reality environment to interact with one another and/or with virtual content that is presented in the mixed reality environment.

FIG. 21 is a schematic diagram showing an example environment 2100 for enabling two or more users (e.g., user 106A, user 106B, and/or user 106C) in a mixed reality environment to interact with one another and/or with virtual content that is presented in the mixed reality environment. In the example environment 2100, a server 2102 can send and receive data to one or more client devices (e.g., client 2104, client 2106, and/or client 2108). The server 2102 can be the service provider 102 or a device (e.g., device 108A). Each of the client devices (e.g., client 2104, client 2106, and/or client 2108) can correspond to device 108A, 108B, and/or 108C. The one or more client devices (e.g., client 2104, client 2106, and/or client 2108) can send requests and receive data associated with commands for rendering and/or interacting with virtual content. The server 2102 can manage the requests and commands to synchronize communication and/or virtual content rendering between the one or more client devices (e.g., client 2104, client 2106, and/or client 2108) and to support security, syncing of variables (e.g., state variables), managing timing (e.g., animation timing, etc.), etc.

The processes described in FIGS. 22 and 23 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The example process is described in the context of the environment 2100 of FIG. 21 but is not limited to that environment.

Figure 22:
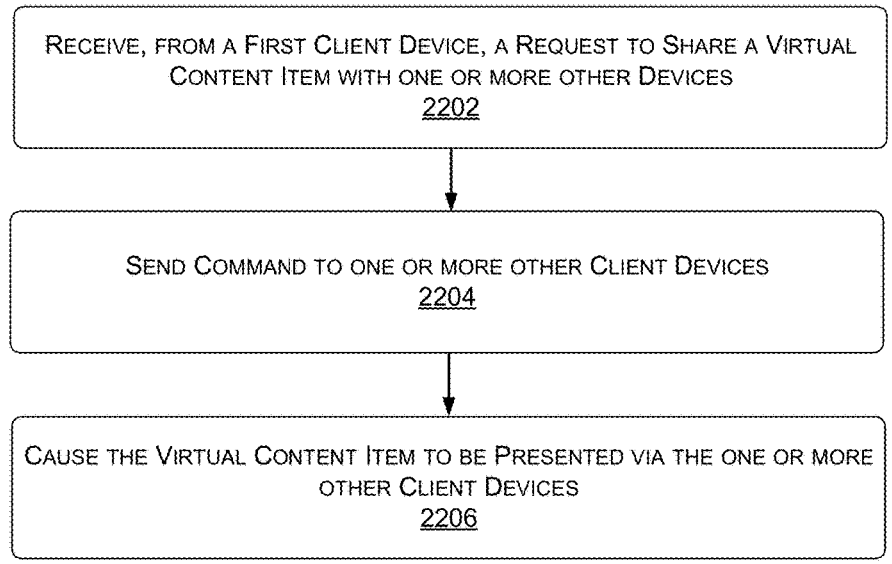
FIG. 22 is a flow diagram that illustrates an example process to cause the visibility of virtual content to be modified in a mixed reality environment.

FIG. 22 is a flow diagram that illustrates an example process 2200 to cause the visibility of virtual content to be modified in the mixed reality environment.

Block 2202 illustrates receiving, from a first client device (e.g., client 2104), a request to share a virtual content item with one or more other client devices (e.g., client 2106 and/or client 2108). In this example, the first client device (e.g., client 2104) can be the owner of the virtual content item and can determine who to share the virtual content item with and/or when to make the virtual content item private.

Block 2204 illustrates sending a command to one or more other client devices (e.g., client 2106 and/or client 2108). The server 2102 can send the command to the one or more other client devices (e.g., client 2106 and/or client 2108). The command can include rendering data and, in some examples, frame messages for rendering by the one or more other client devices (e.g., client 2106 and/or client 2108), as described above.

Block 2206 illustrates causing the virtual content item to be presented via the one or more other client devices (e.g., client 2106 and/or client 2108). As described above, the rendering module 136 associated with the individual client devices (e.g., client 2106 and/or client 2108) can render the virtual content item in the mixed reality environment. The users (e.g., user 106A and/or user 106B) corresponding to the one or more other client devices (e.g., client 2106 and/or client 2108) can interact with the virtual content item as long as the first client device (e.g., client 2102) continues to share the virtual content item with the one or more other client devices (e.g., client 2106 and/or client 2108). In some examples, the one or more client devices (e.g., client 2106 and/or client 2108) may receive previously rendered frames via frame messages and may present the virtual content item based at least in part on presenting the previously rendered frames.

The first client device (e.g., client 2104) can request to make the virtual content item private via a process similar to example process 2200. The first client device (e.g., client 2104) can request to make a virtual content item private with respect to one or more other client devices (e.g., client 2106 and/or client 2108). The server 2102 can send a command to one or more other client devices (e.g., client 2106 and/or client 2108). The command can include data indicating that the virtual content item is no longer visible with respect to one or more of the other client devices (e.g., client 2106 and/or client 2108), as described above. Accordingly, the rendering module 136 associated with the individual client devices (e.g., client 2106 and/or client 2108) can terminate rendering the virtual content item in the mixed reality environment.

In some examples, based at least in part on any one of the client devices (e.g., client 2104, client 2106, and/or client 2108) accessing a virtual content item, the server 2102 can send data associated with a virtual content item to each of the other client devices (e.g., client 2104, client 2106, and/or client 2108). The data can instruct all of the client devices (e.g., client 2104, client 2106, and/or client 2108) (i.e., the rendering module 136 associated with all of the client devices) to create and load the virtual content item. However, the client devices (e.g., client 2104, client 2106, and/or client 2108) can hide the virtual content item until the client devices (e.g., client 2104, client 2106, and/or client 2108) receive data indicating that owner of the virtual content item shared the virtual content item with the client devices (e.g., client 2104, client 2106, and/or client 2108). The owner of the virtual content item can send a request to share the virtual content item with one or more of the other client devices (e.g., client 2104, client 2106, and/or client 2108) and the server 2102 can send a command to the one or more client devices (e.g., client 2104, client 2106, and/or client 2108) so that the one or more client devices (e.g., client 2104, client 2106, and/or client 2108) can render the virtual content item. The command may be associated with rendering data and/or frame messages, as described above.

Figure 23:
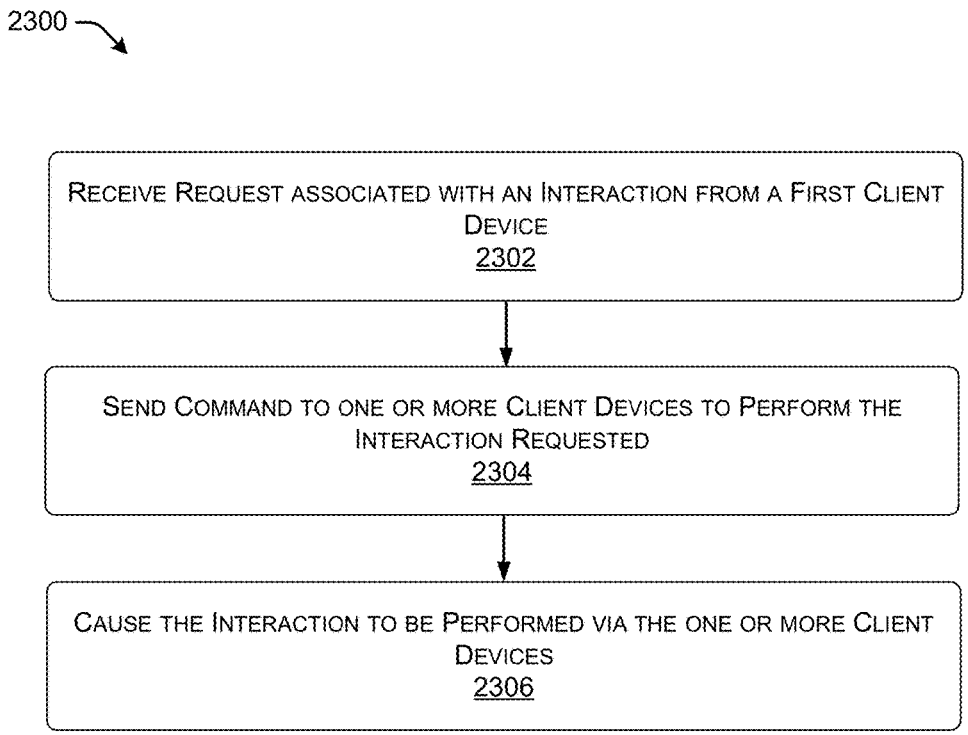
FIG. 23 is a flow diagram that illustrates an example process to cause an interaction associated with the virtual content to be performed via one or more devices in a mixed reality environment.

FIG. 23 is a flow diagram that illustrates an example process 2300 to cause an interaction with a virtual content item to be performed via one or more client devices (e.g., client 2104, client 2106, and/or client 2108) in the mixed reality environment.

Block 2302 illustrates receiving, from a first client device (e.g., client 2104), a request to interact with a virtual content item. For instance, the first client device (e.g., client 2104) can desire to move the virtual content item, cause the virtual item to rotate, etc. Block 2304 illustrates sending a command to all of the client devices (e.g., client 2104, client 2106 and/or client 2108) that have permission to view the virtual content item to perform the interaction requested. The server 2102 can send the command to the client devices (e.g., client 2104, client 2106, and/or client 2108) that have permission to view the virtual content item. The command can include rendering data, data associated with the interaction, and, in some examples, frame messages for rendering by the client devices (e.g., client 2104, client 2106, and/or client 2108), as described above. Block 2306 illustrates causing the interaction to be performed on the virtual content item via the client devices (e.g., client 2104, client 2106, and/or client 2108). As described above, the rendering module 216 associated with the individual client devices (e.g., client 2104, client 2106, and/or client 2108) can render the virtual content item in the mixed reality environment and can modify the virtual content item based on the interaction requested. The users (e.g., user 106A, user 106B, and/or user 106C) corresponding to the client devices (e.g., client 2104, client 2106, and/or client 2108) can interact with the virtual content item as long as the first client device (e.g., client 2104) continues to share the virtual content item with the one or more other client devices (e.g., client 2106 and/or client 2108).

Example Clauses

A. A method comprising: receiving a first set of values for a physical attribute of an object measured at a first time; receiving instructions to virtually paint a portion of the object in a mixed reality environment; measuring a second set of values for the physical attribute of the portion of the object at a second time in the mixed reality environment; comparing the second set of values to the first set of values to produce a comparison; and determining a type of paint to apply onto the object, wherein the determining is based, at least in part, on the instructions and the comparison.

B. The method as claim A recites, wherein the type of paint is based at least in part on color, brightness, albedo, or hue.

C. The method as claim A recites, further comprising: determining a placement location of the paint, wherein the determining is based, at least in part, on the instructions.

D. The method as claim A recites, wherein the instructions comprise drawing instructions that designate the portion of the object to be painted.

E. The method as claim A recites, wherein the object is a real object.

F. The method as claim A recites, wherein the physical attribute is a kinematic parameter.

G. The method as claim A recites, wherein the first set of values and the second set of values for the physical attribute comprise respective mappings of the physical attribute over at least a portion of the object.

H. A method comprising: receiving stored inventory data for a set of objects in a first state; virtually painting at least a portion of the set of objects in a second state in a mixed reality environment; determining current inventory data for the virtually painted at least the portion of the set of objects in the second state; comparing the current inventory data to the stored inventory data to produce a comparison; and determining a change in inventory for the set of objects in the second state relative to the set of objects in the first state, wherein the determining is based, at least in part, on the comparison.

I. The method as claim H recites, wherein the set of objects in the first state comprises a first number of the objects and the set of objects in the second state comprises a second number of the objects, wherein the second number is different from the first number.

J. The method as claim H recites, wherein the stored inventory data and the current inventory data comprise a location and number of individual objects of the set of objects in the first state and the second state, respectively.

K. The method as claim H recites, wherein virtually painting at least a portion of the set of objects in the second state comprises drawing a virtual line across the at least the portion of the set of objects in the second state.

L. The method as claim H recites, further comprising: causing virtual paint to be applied to portions of the set of objects in the second state that are different from corresponding portions of the set of objects in the first state to distinguish from portions of the set of objects in the second state that are same as corresponding portions of the set of objects in the first state.

M. The method as claim H recites, further comprising: causing virtual paint to be applied to portions of the set of objects in the second state that are same as corresponding portions of the set of objects in the first state to distinguish from portions of the set of objects in the second state that are different from corresponding portions of the set of objects in the first state.

N. The method as claim H recites, wherein the stored inventory data comprises an image captured at a time that the set of objects is in the first state.

O. The method as claim H recites, wherein the set of objects are real objects.

P. The method as claim H recites, wherein the comparing the current inventory data to the stored inventory data comprises comparing a subset of the current inventory data to the stored inventory data, wherein the subset is based, at least in part, on at least one physical attribute of the set of objects in the second state.

Q. A system comprising: a mixed reality display device operable in a mixed reality environment; and a device communicatively coupled to the mixed reality display device, the device comprising: one or more processors; memory; and one or more modules stored in the memory and executable by the one or more processors to perform operations comprising: determining differences between a first map of a physical parameter of an object and a second map of the physical parameter of the object; and virtually painting a particular region of the object, wherein the location of the particular region is based, at least in part, on the determined differences.

R. The system as claim Q recites, wherein the first map of the physical parameter of the object comprises first values of the physical parameter at a first time and the second map of the physical parameter of the object comprises second values of the physical parameter at a second time.

S. The system as claim Q recites, wherein the physical parameter is a kinematic attribute of the object.

T. The system as claim Q recites, wherein the physical attribute is a compound physical attribute comprising two or more parameters of the object.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "may" or "might," unless specifically stated otherwise, are understood within the context to present that certain examples include, while other examples do not include, certain features, variables and/or steps. Thus, such conditional language is not generally intended to imply that certain features, variables and/or steps are in any way required for one or more examples or that one or more examples necessarily include logic for deciding, with or without user input or prompting, whether certain features, variables and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any process descriptions, variables or blocks in the flow diagrams described herein and/or depicted in the attached figures should be understood as potentially representing modules, segments, or portions of code that include one or more executable instructions for implementing specific logical functions or variables in the routine. Alternate implementations are included within the scope of the examples described herein in which variables or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the variables of which are to be understood as being among other acceptable examples. All such modifications and variations are intended to be included herein within the scope of this disclosure and protected by the following claims.

What is claimed:

1. A method comprising:
    receiving a first set of values for a physical attribute of an object measured at a first time;
    receiving instructions to virtually paint a portion of the object in a mixed reality environment;
    measuring a second set of values for the physical attribute of the portion of the object at a second time in the mixed reality environment;
    comparing the second set of values to the first set of values to produce a comparison;
    determining a type of paint to apply onto the object, wherein the determining is based, at least in part, on the instructions and the comparison; and
    painting the object such that the paint reflects a change for the physical attribute from a first time to a second time.

2. The method as claim 1 recites, wherein the type of paint is based at least in part on color, brightness, albedo, or hue.

3. The method as claim 1 recites, further comprising: determining a placement location of the paint, wherein the determining is based, at least in part, on the instructions.

4. The method as claim 1 recites, wherein the instructions comprise drawing instructions that designate the portion of the object to be painted.

5. The method as claim 1 recites, wherein the object is a real object.

6. The method as claim 1 recites, wherein the physical attribute is a kinematic parameter.

7. The method as claim 1 recites, wherein the first set of values and the second set of values for the physical attribute comprise respective mappings of the physical attribute over at least a portion of the object.

8. A method comprising:
    receiving stored inventory data for a set of objects in a first state; virtually painting at least a portion of the set of objects in a second state in a mixed reality environment;
    determining current inventory data for the virtually painted at least the portion of the set of objects in the second state;
    comparing the current inventory data to the stored inventory data to produce a comparison; and
    determining a change in inventory for the set of objects in the second state relative to the set of objects in the first state, wherein the determining is based, at least in part, on the comparison.

9. The method as claim 8 recites, wherein the set of objects in the first state comprises a first number of the objects and the set of objects in the second state comprises a second number of the objects, wherein the second number is different from the first number.

10. The method as claim 8 recites, wherein the stored inventory data and the current inventory data comprise a location and number of individual objects of the set of objects in the first state and the second state, respectively.

11. The method as claim 8 recites, wherein virtually painting at least a portion of the set of objects in the second state comprises drawing a virtual line across the at least the portion of the set of objects in the second state.

12. The method as claim 8 recites, further comprising:
    causing virtual paint to be applied to portions of the set of objects in the second state that are different from corresponding portions of the set of objects in the first state to distinguish from portions of the set of objects in the second state that are same as corresponding portions of the set of objects in the first state.

13. The method as claim 8 recites, further comprising:
    causing virtual paint to be applied to portions of the set of objects in the second state that are same as corresponding portions of the set of objects in the first state to distinguish from portions of the set of objects in the second state that are different from corresponding portions of the set of objects in the first state.

14. The method as claim 8 recites, wherein the stored inventory data comprises an image captured at a time that the set of objects is in the first state.

15. The method as claim 8 recites, wherein the set of objects are real objects.

16. The method as claim 8 recites, wherein the comparing the current inventory data to the stored inventory data comprises comparing a subset of the current inventory data to the stored inventory data, wherein the subset is based, at least in part, on at least one physical attribute of the set of objects in the second state.

17. A system comprising:
    a mixed reality display device operable in a mixed reality environment; and a device communicatively coupled to the mixed reality display device, the device comprising: one or more processors;
    memory; and
    one or more modules stored in the memory and executable by the one or more processors to perform operations comprising:
        determining differences between a first map of a physical parameter of an object and a second map of the physical parameter of the object; and virtually painting a particular region of the object, wherein the location of the particular region is based, at least in part, on the determined differences.

18. The system as claim 17 recites, wherein the first map of the physical parameter of the object comprises first values of the physical parameter at a first time and the second map of the physical parameter of the object comprises second values of the physical parameter at a second time.

19. The system as claim 17 recites, wherein the physical parameter is a kinematic attribute of the object.

20. The system as claim 17 recites, wherein the physical attribute is a compound physical attribute comprising two or more parameters of the object.

* * * * *